(12) United States Patent
Perry, Jr. et al.

(10) Patent No.: US 7,970,832 B2
(45) Date of Patent: Jun. 28, 2011

(54) ELECTRONIC MESSAGE DELIVERY WITH ESTIMATION APPROACHES AND COMPLAINT, BOND, AND STATISTICS PANELS

(75) Inventors: George Thomas Perry, Jr., Oakland, CA (US); Andrew Flury, San Bruno, CA (US); Scott Banister, Half Moon Bay, CA (US); Patrick R. Peterson, San Bruno, CA (US); James F. Moore, Menlo Park, CA (US); Michael Varney Olivier, Belmont, CA (US)

(73) Assignee: Return Path, Inc., New York, NY (US)

( * ) Notice: Subject to any disclaimer, the term of this patent is extended or adjusted under 35 U.S.C. 154(b) by 1364 days.

(21) Appl. No.: 10/856,693

(22) Filed: May 28, 2004

(65) Prior Publication Data
US 2010/0281535 A1    Nov. 4, 2010

Related U.S. Application Data

(63) Continuation-in-part of application No. 10/717,441, filed on Nov. 18, 2003, now Pat. No. 7,293,065.

(60) Provisional application No. 60/428,134, filed on Nov. 20, 2002, provisional application No. 60/482,883, filed on Jun. 25, 2003.

(51) Int. Cl.
*G06F 13/00*    (2006.01)
(52) U.S. Cl. .......................... 709/206; 709/219; 709/223
(58) Field of Classification Search .................. 709/204, 709/206, 217, 219, 223
See application file for complete search history.

(56) References Cited

U.S. PATENT DOCUMENTS

| | | | |
|---|---|---|---|
| 5,999,967 A | 12/1999 | Sundsted | |
| 6,192,114 B1 | 2/2001 | Council | |
| 6,421,709 B1 | 7/2002 | McCormick et al. | |
| 6,460,050 B1 | 10/2002 | Pace et al. | |
| 6,697,462 B2 * | 2/2004 | Raymond | 379/93.02 |
| 2002/0133469 A1 | 9/2002 | Patton | |

FOREIGN PATENT DOCUMENTS

WO    WO 01/67330 A1    9/2001

(Continued)

OTHER PUBLICATIONS

Cynthia Dwork, et al., "Pricing via Processing or Combatting Junk Mail," Draft of full version, preliminary version of this paper was presented at Crypto '92, pp. 1-11.

(Continued)

*Primary Examiner* — Viet Vu
(74) *Attorney, Agent, or Firm* — Blank Rome LLP

(57) ABSTRACT

Interfaces for message delivery approaches are disclosed. The interface may include pages for administering accounts for senders, pages for administering message processing systems, and pages for viewing information about senders or message processing systems. In another aspect, automatic alert mechanisms are disclosed. The alert mechanisms send a message to one or more users or machines that have been registered to receive alerts. Alerts may be triggered by any event related to a sender, a message, or a message processing system or may be triggered by any other condition or event. In another aspect, techniques for automatically disabling senders are disclosed. The automatic disabling of a sender may be triggered by any event related to a sender, a message, or a message processing system or may be triggered by any other condition or event.

18 Claims, 25 Drawing Sheets

FOREIGN PATENT DOCUMENTS

| | | |
|---|---|---|
| WO | WO 02/25464 A1 | 3/2002 |
| WO | WO 02/39356 A1 | 5/2002 |

OTHER PUBLICATIONS

Declude, "List of All Known DNS-based Spam Databases," Apr. 20, 2004, http://www.declude.com/Articles.asp?ID=97, data retrieved Aug. 19, 2004, pp. 1-15.

International Searching Authority, "Notification of Transmittal of the International Search Report or the Declaration," Jun. 8, 2004, 7 pages.

Current Claims in PCT patent application, International Application No. PCT/US03/37417, 16 pages.

* cited by examiner

ELECTRONIC MESSAGE DELIVERY WITH ESTIMATION APPROACHES AND COMPLAINT, BOND, AND STATISTICS PANELS

RELATED APPLICATIONS; PRIORITY CLAIM

This application claims priority as a continuation-in-part of U.S. Non-Provisional patent application Ser. No. 10/717,441, filed Nov. 18, 2003, naming Banister et al. as inventors, now U.S. Pat. No. 7,293,065, which in turn claims domestic priority under 35 U.S.C. §119 from prior U.S. Provisional Patent application Nos. 60/428,134, filed Nov. 20, 2002, naming Banister et al. as inventors, and 60/482,883, filed Jun. 25, 2003 naming Banister et al. as inventors, the entire contents of which are hereby incorporated by reference for all purposes as if fully set forth herein.

This application is related to U.S. patent application Ser. No. 10/857,641 filed May 28, 2004, entitled "TECHNIQUES FOR DETERMINING THE REPUTATION OF A MESSAGE SENDER", naming Brahms et al. as inventors, which is hereby incorporated by reference for all purposes as if fully set forth herein.

This application is related to U.S. patent application Ser. No. 11/062,320, filed (filing date), entitled "COLLECTING, AGGREGATING, AND MANAGING INFORMATION RELATING TO ELECTRONIC MESSAGES", naming Flury et al. as inventors, which is hereby incorporated by reference for all purposes as if fully set forth herein.

FIELD OF THE INVENTION

The present invention generally relates to electronic message delivery with estimation approaches. The invention relates more specifically to methods, systems, and interfaces for ensuring that electronic messages are delivered.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The use of electronic message communication systems has increased significantly in the recent past. However, numerous users of such systems, whether they are message senders or receivers, find such systems inconvenient and cumbersome to use. Similar problems are associated with telephone, facsimile, and e-mail communications, and others.

In the e-mail context, in one past approach, senders marketing commercial products or services would acquire or develop lists of e-mail addresses and then periodically send mass unsolicited e-mail messages ("spam") to all addresses in the lists. Using modern electronic systems, the cost of sending millions of such messages has been negligible, and a response rate of even less than one percent has been considered worthwhile. Thus, successful delivery of unsolicited messages to valid in-boxes of recipients normally translates into income for the sender.

Unfortunately, this approach causes receivers to receive unwanted messages. The perceived direct and indirect costs of receiving "spam" are high. In response, receivers have adopted a variety of approaches to prevent receipt or viewing of unwanted messages.

In one approach, receivers use filtering or blocking technologies that search for keywords in the message subject line and reject or quarantine messages that contain keywords matching a list of prohibited words. In another approach, receivers use "blacklists" to identify and prohibit display of messages from suspect senders of unsolicited messages. Some receivers augment these technologies with personal "white lists" of friends or other acceptable senders; only messages from senders in the "white list" are admitted. The "white lists" and "blacklists" also may come from networked sources. Techniques for performing "blacklist" lookups are described at the document "ip4r.htm" that is available online at the time of this writing at directory "/junkmail/support/" of the "declude.com" domain of the World Wide Web, and www.scconsult.com/bill/.

For legitimate senders, one problem is that legitimate messages do not reach intended receivers because they are blocked by such filtering or blocking technologies. Meanwhile, receivers who use filtering or blocking technologies regularly fail to receive legitimate messages because the filtering and blocking technologies cannot properly distinguish legitimate messages from unwanted messages. Certain industry-standard terms or technical abbreviations may be identical to prohibited keywords, confusing the "spam" filter.

Further, receivers continue to receive large volumes of unwanted messages that are not properly trapped by the "spam" filter. As a result, many receivers now refuse to disclose their address except under limited circumstances. In response, many legitimate senders, such as reputable commercial enterprises, have developed "opt-in" procedures in which the addresses of receivers, such as customers, are not used at all unless the receiver affirmatively agrees to receive messages. Even when this is done, the filtering or blocking technologies may delete or quarantine even those messages from legitimate senders that are directed to receivers who have "opted in."

Consequently, the value of e-mail as a legitimate marketing tool for communications directed to receivers who have "opted in" is decreasing. Many receivers remain essentially defenseless to the daily onslaught of "spam" arriving in their e-mail in-boxes. While many states have enacted legislation that imposes civil or criminal penalties for sending "spam," these remedies are time-consuming for receivers to pursue. In addition, while many Internet Service Providers ("ISPs") actively identify and refuse to communicate or do business with those who send "spam," policing such improper activity imposes a significant cost on the ISP.

ISPs also incur costs associated with processing messages directed to recipients who do not hold an account with the ISP. For these recipients, the ISPs mail system typically generates an automatic "bounce" message that states that the recipient is unknown. Indeed, a "double bounce" may occur when a message bears an invalid sender address, and is sent to an invalid recipient. Costs are associated with maintaining the equipment and software that generates the bounce messages, and for dispatching the bounce messages back into the network to the sender. Thus, there is a need for a system or method that can reduce the number of "bounce" and "double bounce" events experienced by ISPs and derived from unwanted messages.

Thus, the problem of "spam" in the Internet e-mail context is essentially a war of attrition. There are legitimate marketing organizations that send promotional messages by bulk e-mail, and other senders who send valid bulk messages. In general, however, no one benefits from the activities of "spammers,"

other than the "spammers" themselves. ISPs, business enterprises, and end users all suffer inconvenience, costs, and annoyances.

Further, high-value e-mail messages regularly may be blocked or placed into a "Bulk" mail folder, based on rules that appear, to the end user, as complex, random, changing and secret. This costs e-mail marketers, and causes senders to lose confidence in the benefits of e-mail marketing. Moreover, end users are required to invest time in monitoring, checking, delivering, and negotiating "white lists" and similar mechanisms. Even when ISPs and enterprises use anti-"spam" technologies, large numbers of "spam" messages still arrive in the in-boxes of end users, or erroneously are placed in bulk mail folders.

Consequently, systems have been developed to process these messages in ways that attempt to block spam and ensure that valid messages are delivered to receivers. A problem common to all of these systems, however, is that the interfaces to these systems are cumbersome and difficult to use. Some of the interfaces do not provide comprehensive information. Other interfaces do not provide easy to use controls. Yet other systems do not provide adequate functionality.

In addition, if certain important conditions or events occur, e.g. a sender is added to a blacklist, an administrator associated with the sender must actively determine that the condition or event occurred, often by logging into multiple websites.

Whereas the foregoing example problems exist in the context of e-mail, instant messaging, chat-room applications, Web message boards, telephone and facsimile communications suffer from analogous problems. All such systems have difficult to use or cumbersome interfaces.

Based on the foregoing, there is a clear need for improved interfaces for message processing systems and for approaches that will reduce the burden on message senders associated with determining that important conditions or events have occurred.

BRIEF DESCRIPTION OF THE DRAWINGS

The present invention is illustrated by way of example, and not by way of limitation, in the figures of the accompanying drawings and in which like reference numerals refer to similar elements and in which:

FIG. 13 is an illustration that depicts an oversight dashboard page.

FIG. 14 is an illustration that depicts a research page.

FIG. 16A and FIG. 16B together form an illustration that depicts a company administration page.

DETAILED DESCRIPTION OF THE PREFERRED EMBODIMENT

Figure 1A:
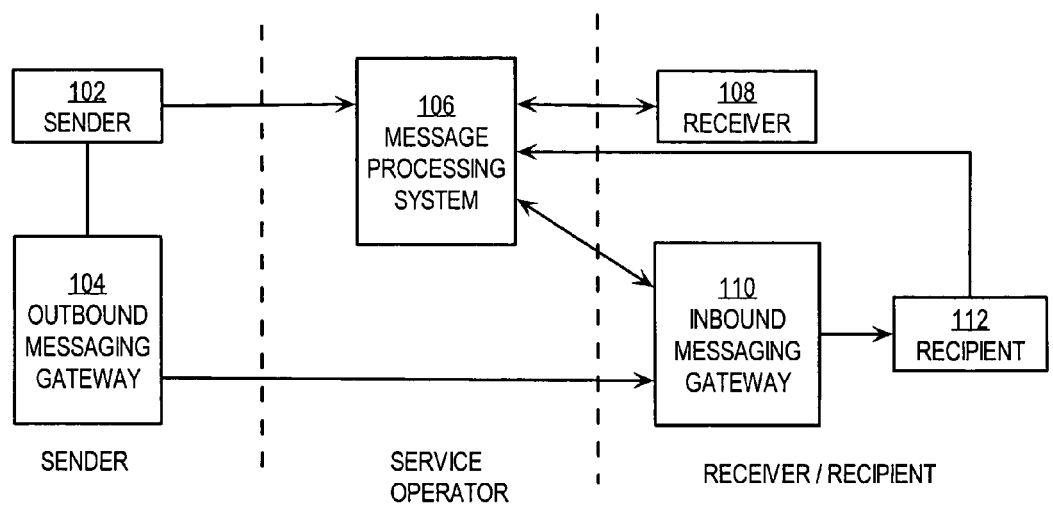
FIG. 1A is a block diagram that illustrates an overview of a system for delivering electronic messages.

Electronic message delivery approaches are described in this application. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Electronic Message Delivery Approaches
   2.1 Terminology
   2.2 System Structural and Functional Overview
   2.3 Encrypted Token Approach For Advertising Message Source
   2.4 Determining Whether to Accept a Message
   2.5 Processing a Report of an Unwanted Message
   2.6 Penalizing Senders
   2.7 Estimation Approaches
   2.8 Example Interface for Querying a Service Operator
3.0 Activating and Deactivating Senders
4.0 Alerts
5.0 Example Graphical User Interface
   5.1 Sender Interface
   5.2 Superuser Interface
   5.3 Oversight Interface
6.0 Implementation Mechanisms—Hardware Overview
7.0 Extensions and Alternatives 1.0 General Overview Interfaces for message delivery approaches are disclosed. The interface may include pages for administering accounts for senders, pages for administering message processing systems, and pages for viewing information about senders or message processing systems. In related features, a sender dashboard page, an oversight dashboard page, a research page, a search results page, a company administration page, an alerts dashboard, or an oversight account page is provided.

In one aspect, automatic alert mechanisms are disclosed. The alert mechanisms send a message to one or more users or machines that have been registered to receive alerts. Alerts may be triggered by any event related to a sender, a message, or a message processing system or may be triggered by any other condition or event. Alerts may be provided to a human or to a machine using any appropriate transmission medium, any appropriate protocol, and in any appropriate format.

In another aspect, techniques for automatically disabling senders are disclosed. The automatic disabling of a sender may be triggered by any event related to a sender, a message, or a message processing system or may be triggered by any other condition or event.

In an additional aspect, techniques are disclosed for facilitating transmission of a message from a sender to a receiver, including receiving a query about whether the sender of the message satisfies specified sending criteria; creating and storing information relating to whether the sender satisfies the specified sending criteria; providing a complaints panel as part of a graphical user interface that reports the information; providing a bond panel as part of the graphical user interface; and providing a statistics by IP address panel as part of the graphical user interface.

In another aspect, techniques are disclosed for facilitating transmission of a message from a sender to a receiver, including receiving a query about whether the sender of the message satisfies specified sending criteria; creating and storing information relating to whether the sender satisfies the specified sending criteria; providing an administrative panel as part of a graphical user interface that displays the information; and providing a company statistics panel as part of the graphical user interface.

In a further aspect, techniques are disclosed for facilitating transmission of a message from a sender to a receiver, including receiving a query about whether the sender of the message satisfies specified sending criteria; creating and storing information relating to whether the sender satisfies the specified sending criteria; providing an administrative panel as part of a graphical user interface that displays the information; providing a complaints panel as part of the graphical user interface; and providing a statistics by IP address panel as part of the graphical user interface.

In another aspect, techniques are disclosed for facilitating transmission of a message from a sender to a receiver, including receiving a query about whether the sender of the message satisfies specified sending criteria; creating and storing information relating to whether the sender satisfies the specified sending criteria; providing a bond group alerts panel as part of a graphical user interface that displays the information; providing an IP alerts panel as part of the graphical user interface; and providing a selectable processing mechanism.

In a further aspect, techniques are disclosed for facilitating transmission of a first message from a sender to a receiver, including associating a user with a particular sender-related event; storing sender identification information in association with a penalty that the sender is willing to incur for the first message that is unwanted by the receiver; receiving a query about whether the sender satisfies specified sending criteria; determining whether the sender satisfies the specified sending criteria; determining whether the particular sender-related event has occurred; if the particular sender-related event has occurred, sending an alert message to the user; and sending a second message specifying whether the sender satisfies the specified sending criteria, for use by the receiver in determining whether to accept the first message.

In yet another aspect, techniques are provided for facilitating transmission of a first message from a sender to a receiver, including associating a particular sender-related event with disabling the sender; storing sender identification information in association with a penalty that the sender is willing to incur for the first message that is unwanted by the receiver; receiving a query about whether the sender of the first message satisfies specified sending criteria; determining whether the sender satisfies the specified sending criteria; determining whether the particular sender-related event has occurred; if the particular sender-related event has occurred, disabling the sender; and if the sender is not disabled, sending a second message specifying whether the sender satisfies the specified sending criteria, for use by the receiver in determining whether to accept the first message.

In other aspects, the invention encompasses a computer apparatus and a machine-readable medium configured to carry out the foregoing steps.

2.0 Electronic Message Delivery Approaches 2.1 Terminology

Throughout this document, the following terms have the following example meanings:

"Bond" means a quantity of value that is transferred by the Sender to the Service Operator before the Sender dispatches one or more bulk messages. A bond may comprise money, resources of any kind, goods, services, or promises.

"Enterprise" means a business entity that is not primarily in the business of sending bulk messages; its employees are often Recipients.

"Receiver" means a business entity, hardware device, software element, or combination of the foregoing that receives messages and distributes the messages to Recipients. Examples of Receivers include business enterprises, Internet Service Providers (ISPs), Web-based e-mail services, etc.

"Recipient" means an individual account, computer, or end user that reads, uses or otherwise consumes a message sent by a Sender. Recipients often are end users who hold accounts with Receivers.

"Sender" means an individual, organization, or business entity that regularly sends large numbers of messages to actual or prospective customers, subscribers, members, or other Recipients. Examples of Senders include retail businesses include online businesses and brick-and-mortar businesses, advertising service firms, electronic mailing list providers, etc. A Sender also comprises an individual who registers and manages Bonded Sender network addresses for a separate end user or system that sends messages or causes messages to be sent.

"Service Operator" means a trusted third party that acts as a provider of the functions and services defined herein.

"Spam" means an unwanted e-mail message, which is typically a mass unsolicited message.

"Submitter" means an individual, organization, or business entity that reports to the Service Operator that one or more received messages are or were unwanted. A Submitter may be a Receiver or a Recipient. A party that makes or sells anti-"spam" filters, software or other technology may act as a Submitter to reduce the number of "false positives" generated by its technology.

2.2 System Structural and Functional Overview

FIG. 1A is a block diagram that illustrates an overview of a system for delivering electronic messages. A Sender 102, which owns, operates or is associated with an outbound messaging gateway 104, is communicatively coupled directly or indirectly through one or more networks to a Message Processing System 106 that is owned or operated by a Service Operator. A Receiver 108 is communicatively coupled to the Message Processing System 106. The Receiver owns, operates, or is associated with an inbound messaging gateway 110. A Recipient is communicatively coupled to gateway 110.

Each Gateway 104, 110 may comprise a general-purpose messaging gateway, also known as a Message Transfer Agent (MTA), mail relay, email relay, email router, Simple Mail Transfer Protocol (SMTP) server, or email gateway, which is specially programmed to perform the functions described herein.

For purposes of illustrating a simple example, FIG. 1A shows one of each element identified above. However, in a practical embodiment, there may be any number of Senders, Receivers, gateways, and Recipients, and the use of thousands or millions of such elements is contemplated. In a high-capacity network environment, Message Processing System 106 may be replicated in one or more instances or sites for scalability or load-balancing purposes. Further, for example purposes, certain embodiments are described herein in the context of processing e-mail messages; however, in other embodiments the messages comprise telephone calls, or pager messages.

In the arrangement of FIG. 1A, in general, in one embodiment, Sender 102 registers with Message Processing System 106 and obtains an account with the Service Operator. Optionally, Receiver 108 also registers and obtains an account. The Sender 102 may select a dedicated source network address that is used for bonded messages, and provides the selected address to Message Processing System 106. At any time thereafter, Sender 102 causes its outbound messaging gateway 104 to send one or more messages, which contain information identifying an offered or promised penalty amount, and are directed to Recipient 112.

The messages are received at the inbound messaging gateway 110 of the Receiver 108. Gateway 110 determines that the messages are bonded. Gateway 110 queries Message Processing System 106 to determine whether the messages originate from a party that is registered in the Message Processing System as a Bonded Sender. Message Processing System 106 and gateway 110 apply one or more validation tests to information in the message or derived from packets that transport the message. Depending on the results of the tests and policy decisions applied by the gateway 110, the message is delivered to the Recipient 112, or a score value is provided to a filter, or the message is discarded, or the message is marked as Bulk, or other actions are taken.

The foregoing is a general statement of operation of one example embodiment that is provided for purposes of orienting the reader to FIG. 1A. However, many variations and additional example functions are described further herein.

Figure 1B:
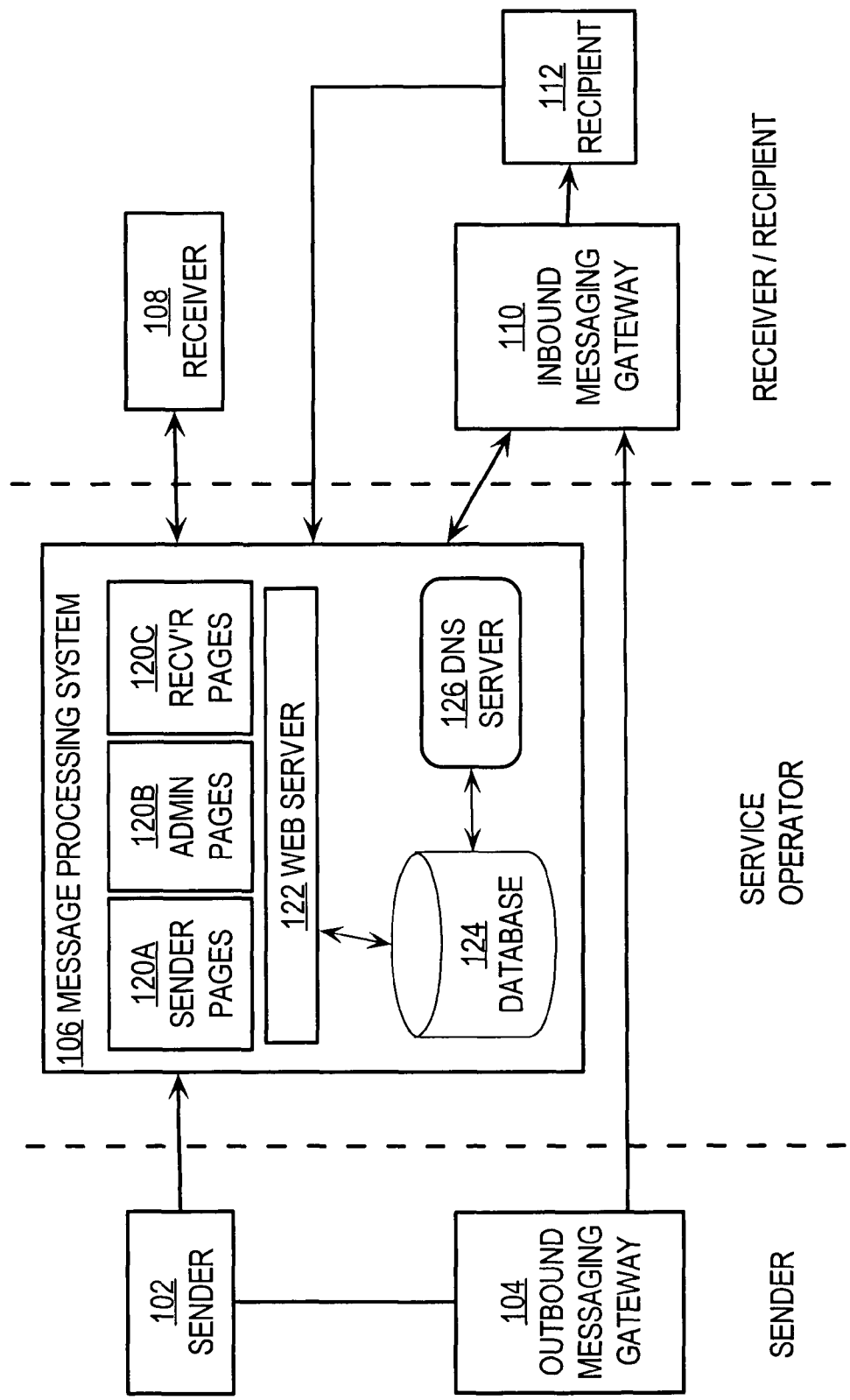
FIG. 1B is a block diagram that illustrates additional elements of the system of FIG. 1B.

FIG. 1B is a block diagram that illustrates additional elements of the system of FIG. 1B. Message Processing System 106 may be implemented as one or more server-class computer systems that host a Web server 122, database 124, and DNS server 126. Web server 122 may comprise a combination of an HTTP server, such as the Apache HTTP server, and an application server such as the WebLogic application server. Database 124 provides a repository for storing information about registered Senders, Receivers, Recipients, bonds, messages, and other metadata, and may comprise a relational database server such as Oracle 8i, Microsoft SQL Server, etc. Database 124 also may contain log information such as a history of network addresses that have been added or deleted by Senders.

DNS server 126 is accessible using Internet Domain Name System ("DNS") protocol requests and can perform resolution of domain names to Internet Protocol ("IP") addresses, provide information about specified IP addresses, etc. For purposes of illustrating a clear example, DNS and IP are described herein for certain embodiments; however, embodiments are not limited to the use of DNS and IP for address processing, and the invention is applicable to any network addressing mechanisms or protocols that may be developed in the future.

For a practical embodiment, DNS server 126 has high capacity. For example, an appropriate DNS server 126 can process on the order of fifty million queries per day. Further, a DNS server that has nearly 100% availability and does not impose unreasonable message latency should be provided.

Functions described herein may be implemented in one or more Java Server Pages (JSPs), Active Server Pages (ASP's), or other software elements. For purposes of illustrating an example, FIG. 1B shows a JSP implementation in which functions are organized as Sender Pages 120A and Administrative ("Admin") Pages 120B. Optionally, Receiver ("Recv'r") Pages 120C provider receiver functions. In this implementation, Sender 102 and Receiver 108 may access functions of system 106 using a conventional Web browser application, such as Microsoft Internet Explorer, Netscape Communicator, etc. Similarly, gateway 110 may access functions of system 106 by directing HTTP requests to system 106.

In particular, Sender 102 interacts with Sender Pages 120A to register with the system and obtain information about bond amounts offered or promised, credit exposure, complaints received, message volume sent and fines incurred. An administrator associated with the Service Operator interacts with Admin Pages 120B to perform administrative functions such as user registration and validation, providing registered Sender information to representatives of Senders, user maintenance, address maintenance, system maintenance, bond forfeiture, invoicing, account reviews, dispute resolution, report generation, etc. A Receiver or Recipient interacts with Receiver Pages 120C to register with the system, report unwanted messages, investigate credit and bond status, etc.

Message Processing System 106 also may comprise one or more other software elements, hardware elements, or manual operations that perform the functions described herein.

Figure 2A:
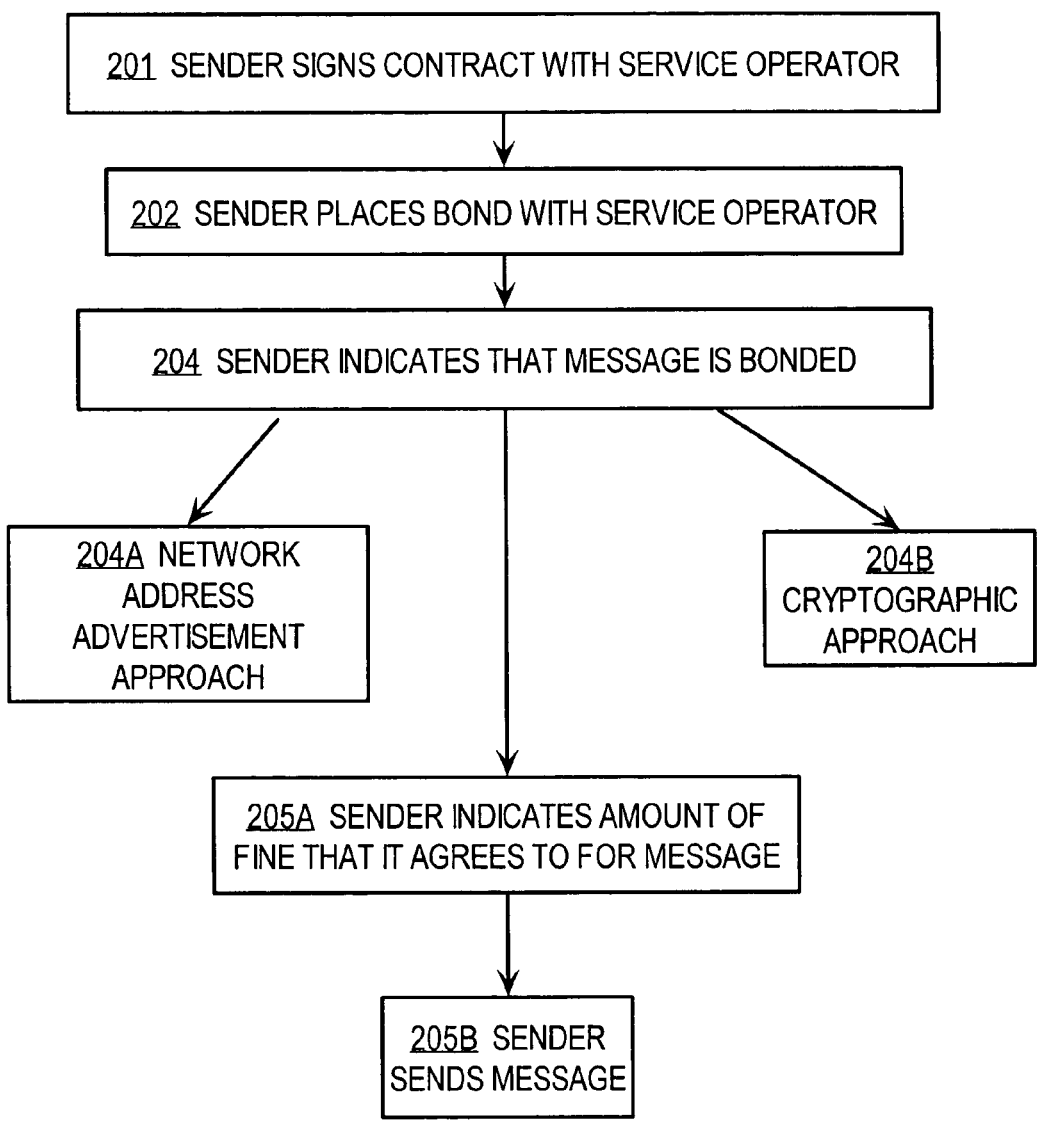
FIG. 2A is a flow diagram of a process of electronic message delivery, according to one embodiment.

FIG. 2A is a flow diagram of a process of electronic message delivery, according to one embodiment. In block 201, one or more Senders enter into contracts with the Service Operator. In one embodiment, the Senders agree to pay fines for sending unwanted messages, subject to a dispute resolution process that addresses fraudulent reports of unwanted messages, and false reports from Recipients who did not actually receive the messages.

Block 201 may include engaging in a registration process in which the Senders provide contact information and credit information to the Service Operator. In the registration process, an administrator or other authorized representative of a Sender or Receiver may establish a password-protected account at the Service Operator for the purpose of entering, updating, and viewing information relating to their interaction with the Service Operator.

In one embodiment, as part of block 201, a Sender provides, to the Service Operator, one or more IP addresses that it wishes to bond, and specifies whether DNS "A" and "PTR" records exist in the DNS system for the addresses.

In another embodiment, the terms and conditions of the contract specify that: the Service Operator will review the address information that is provided, to verify ownership of the IP addresses and proper configuration of the DNS records; the Sender may use the system to send only messages that conform to a set of standards; and other terms and conditions relating to legal liability, confirmation of registration, fees, etc. The contract may be implemented as a "click-to-accept" online form.

In yet another embodiment, any or all of the steps in the registration process described above are performed using non-online communication methods, such as by telephone, fax, etc. In this embodiment, a representative of the Sender contacts an administrator associated with the Service Operator, who creates records in the system that capture the above-described information. For example, the contract terms outlined above may be negotiated and agreed to using fax communications.

Block 201 also may involve the Service Operator performing a validation of the network addresses and other information provided by a Sender. For example, an administrator of the Service Operator performs a reverse (PTR) DNS lookup for each IP address provided by the Sender, and records information about each domain that is returned by the DNS system. The Service Operator performs a "whois" lookup to verify that the domain name ownership of record matches the Sender. Other tests may be performed to verify that the Sender is not a "spammer" or to verify that the Sender segregates its bulk mailing lists to ensure that only non-"spam" messages are directed to bonded addresses.

In block 202, in one embodiment, a Sender places a bond with the Service Operator. Placing the bond may form part of entering a contract in block 201. In some embodiments, the Service Operator performs a credit check on the Sender and does not require a bond. Alternatively, a Sender lacking adequate credit or payment history is required to deposit funds with the Service Operator. The deposited funds may be placed in an escrow account, trust account, or similar account from which the Service Operator may withdraw funds only upon determining that an unwanted message has been sent.

In block 204, the Sender indicates that a particular communication is bonded and subject to fines. Such an indication may be provided in several ways. In a first approach, indicated by block 204A, the Sender advertises a particular network address, selected by the Sender as its "Bonded Sender" address. In one embodiment, which is used in networks that use Internet Protocol ("IP") addresses to identify the source of a message, the Sender registers a specified Bonded Sender source IP address with the Service Operator, and then sends bonded messages only from that address. Alternatively, as in block 204B, a cryptographic approach is used. Methods of advertising a message source are described further in other sections hereof.

In one embodiment, step 204 is not performed and step 202 may be followed by step 205A and either or both of steps 204A and 204B. For example, if step 202 is followed by step 204A, then the Sender may place a bond with the Service Operator (step 202) and then advertise a particular network address, selected by the Sender, as its "Bonded Sender" address (step 204A). In such an example, the Service Operator may indicate that a particular message is bonded if the particular message is sent from a network address that has been specified as a "Bonded Sender" address.

In block 205A, the Sender indicates what amount of fine it agrees to pay if a particular message or communication is unwanted. In one approach, the Sender registers a proposed fine amount with the Service Operator before sending messages. Alternatively, a cryptographic approach of specifying the fine may be used. In yet another alternative, the Sender issues a promise to the Service Operator that the Sender will pay a particular fine amount for unsolicited messages; an actual transfer of funds in advance of sending messages is not required. In one embodiment, fixed or variable penalty values are imposed, based on a complaint rate or other metric. For example, a Sender may be debited $20 for every complaint in excess of one per million. Any other suitable complaint rate or penalty value may be used. In one embodiment, all fines may be a single specified amount that does not vary, such as $1 per unwanted message. Minimum fines, maximum fines, or fines that vary for particular messages or Recipients also may be used. In block 205B, the Sender sends the message. Block 205B may involve causing a messaging gateway to dispatch one or more messages into a network.

Figure 2B:
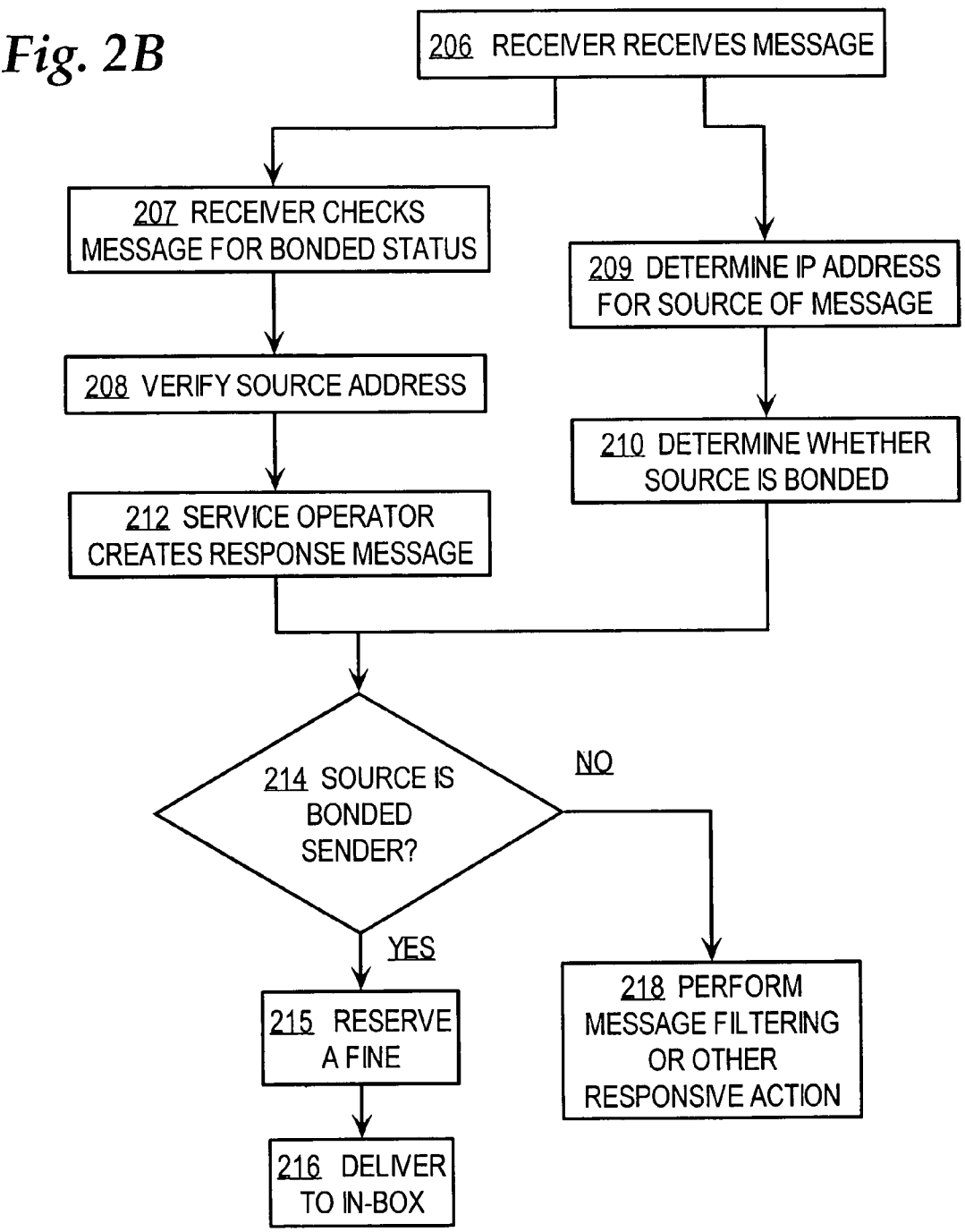
FIG. 2B is a flow diagram of a method of processing received electronic messages.

FIG. 2B is a flow diagram of a method of processing received electronic messages. Referring first to block 206, a Receiver, who may be an individual end user, an ISP, a business enterprise, or any other person or institution, receives a message from the Sender.

In certain embodiments, Receivers and Recipients register with the Service Operator before receiving messages in order to obtain a right to use the services of the Service Operator. For example, Receivers and Recipients register as part of block 201 of FIG. 2A. Registration of a Receiver or Recipient may involve providing contact information, domain name and e-mail address information, gateway information, information about anti-"spam" technologies then in use by the Receiver, etc. In response to successful registration of a Receiver, the Service Operator may provide Bonded Sender DNS information to the Receiver or Recipient to enable them to configure their gateways to interoperate with the system.

Block 206 may involve performing conventional anti-"spam" checks using commercial anti-"spam" filtering or blocking technology. In such an embodiment, the Receiver proceeds with the remaining steps of FIG. 2B only if a message is identified as "spam." If the message passes the "spam" checks, then it is forwarded to the Recipient. In an alternate embodiment, the remaining steps of FIG. 2B are performed regardless of the results of the anti-"spam" filtering technology.

After receiving the message, the receiver may either check the message for bonded status (block 207) or, if bonded status is going to be determined based on an IP address associated with the message, then the IP address associated with the source of the message is determined (block 209).

In block 207, the Receiver checks the communication for bonded status. This may involve several tests.

For example, in block 208, the Receiver verifies the source address of the received message against the database of advertised Bonded Sender addresses. For example, the Receiver issues a query in an agreed-upon protocol to the Service Operator, and provides the source address of a message that the Receiver has received. In one specific embodiment, as in the example of FIG. 1A and FIG. 1B, block 208 involves gateway 110 issuing a DNS lookup request to DNS server 126 that includes the source address of the received message. If DNS server 126 locates the source address in its database, then a first specified response value is returned. If the source address is not in the DNS database, then a second specified response value is returned. In one embodiment, the first response value is "127.0.0.2" and the second response value is "127.0.0.3."

The Service Operator creates a response message that identifies whether the source address is a registered Bonded Sender address, and sends the response message to the Receiver, as shown by block 212.

The foregoing tests also may involve determining the fine amount proposed by the Sender for the message. Further, the Receiver may undertake more or fewer tests, or different tests, depending on the amount of bond or penalty that has been offered or promised by a Sender for a particular message.

In block 209, an IP address is determined for the source of the message. The IP address of the source of the message may be determined in any appropriate fashion. In one embodiment, the IP address is determined based on the connection properties of the incoming message. For example, using the mail receiving application "sendmail," the Receiver may determine the IP address as the connecting IP address. Alternatively, the Receiver may determine the IP address based on the Received headers of the message.

Once the IP address is determined in block 209, then in block 210, a check is performed to determine whether the Sender is bonded. In order to determine whether a sender is bonded, the Receiver may send a query to a Service Operator, which query requests an indication of whether the Sender is bonded. The Service Operator may then return a message indicating the whether or not the IP address is bonded. An example interface for sending messages to and receiving message from a Service Operator is given in the section entitled Example Interface for Querying a Service Operator.

Alternatively, a Receiver may check a local repository that lists IP addresses for bonded senders. If the IP address associated with the Sender is in the local repository, then the Sender is bonded. In one embodiment, the local repository of bonded senders is copied from an central service, such as a Service Operator, using a DNS zone transfer on a regular basis (e.g. hourly, daily, weekly, etc).

Depending on whether the source address identifies a registered Bonded Sender, the Receiver can take responsive action. For example, in block 218, if the source address is not a registered Bonded Sender address, as tested in block 214, the Receiver may elect to block the message, or deliver it to a bulk e-mail folder, or perform any other message filtering step.

If the source address is verified as a registered Bonded Sender address, then the Receiver may reserve a fine amount by sending a message to the Service Operator in an agreed-upon protocol, as shown by block 215. In response, the Service Operator creates a record of a fee reservation in its database, determines an expiration date for the reservation, and issues a response message to the Receiver.

In one embodiment, reserving a fine may constitute an agreement by the Receiver to deliver the message to the Recipient's In-box without any special marking or processing, that is, without labeling the message as Bulk, storing the message in a Bulk folder, etc. In this embodiment, the Service Operator and Receivers enter into a contract providing and enforcing such terms. Alternatively, such a rule may be enforced in the absence of a contract based good faith relationships of the parties.

Further, in still another alternative, a fee reservation may comprise agreements by the Service Operator to pay a portion of any fine to the Receiver in the event that a Recipient reports the message as unwanted before the reservation expires. Each reservation is associated with an expiration date, after which the reservation expires. The expiration date may occur at any time after the issuance of a reservation. In one embodiment, the reservation is typically one to four days after issuance of the reservation.

Use of reservations enables the Service Operator to evaluate and measure the scope of its current credit risk with respect to each Sender. For example, issuing more reservations means that more opportunities for junk reports are created. Further, based on reservation volume, the Service Operator may demand a deposit of additional funds by the Sender, or may perform additional credit checks to verify that its exposure to Receivers is acceptable.

Thereafter, the Receiver could elect to deliver the message to the in-box of the Recipient, as shown by block 216.

In an alternative embodiment, a gateway associated with the Receiver may deliver the message to an outbound address that is selected from among a plurality of outbound addresses. In this embodiment, as part of block 201, a particular Sender may register a plurality of authorized outbound Bonded Sender addresses. Each such address may have a unique name. One or more routing rules determine how to select an outbound message address based on a Sender address. When the Service Operator determines that a Bonded Sender has sent a particular message, the service provider applies the rules, or an injection filter mechanism, to map the source address specified in the message to one of the multiple registered addresses. The Service Operator provides the mapped outbound address to the gateway, which delivers the message to that address.

In an alternative embodiment, by advance agreement between the Receiver and the Service Operator, the Receiver is required to deliver all messages having registered Bonded Sender addresses to the in-boxes of the Recipients of the messages.

In another alternative embodiment, when a Receiver delivers a message having a registered Bonded Sender address to the in-box of the Recipient of the message, the Receiver marks the message as originating from a registered Bonded Sender. For example, a graphical user interface that displays a message in-box of an account-holder could display a distinctive icon that identifies messages originating from a registered Bonded Sender. Alternatively, the Receiver may modify the subject line of the message to indicate that it originates from a registered Bonded Sender.

In still another alternative embodiment, the specific action taken by the Receiver may vary depending upon the amount of bond that is offered or promised by the Sender.

According to one embodiment, the mail delivery approaches herein provide a system and process with which a Receiver of unwanted e-mail can indicate, to the Service Operator, that a message is unwanted, implicitly requesting enforcement of the bond or issuance of a penalty. In another embodiment, a third-party server or system may collect such complaints from Receivers. The complaint collector can forward complaints to the Service Operator or perform any responsive action described herein that the Service Provider could perform, as proxy for the Service Operator. An example of a third party that could be used as a complaint collector is the SPAMCOP™ service available from SpamCop.net, Inc. at the domain spamcop.net.

In one alternative embodiment, a zone transfer function is provided. Using the zone transfer function, an authorized individual associated with a Receiver can inform the Service Operator, in a single operation, that a plurality of servers or other facilities associated with the Receiver have moved to a different range of addresses.

An administrator of the Service Operator also may generate reports for Senders and Receivers. For example, reports may specify the number of queries issued by a Receiver, number of entities performing queries, which IP addresses were queried, etc.

Figure 3:
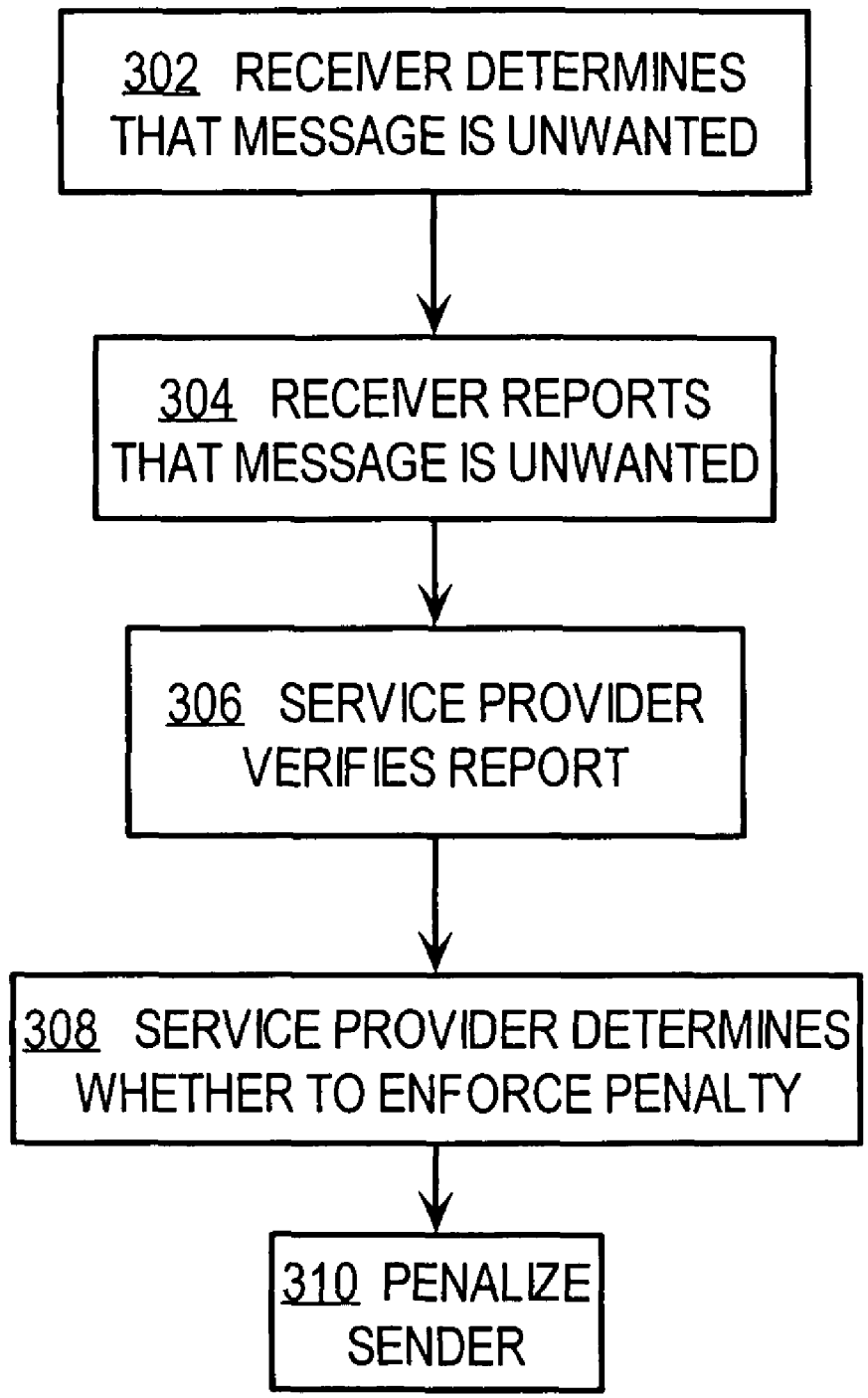
FIG. 3 is a flow diagram of a method of reporting an unwanted message.

FIG. 3 is a flow diagram of a process of reporting an unwanted message. In block 302, a Receiver determines that a received message is unwanted. A Receiver may not want a received message for several reasons. For example, the unwanted message may be a "spam" message, or the message may have resulted from failure of the Sender to honor a request to "unsubscribe" from a mailing list, failure of the Sender to comply with principles of the Direct Marketing Association, failure of the Sender to provide an "unsubscribe" link in a Web site, etc. Determining that a message is unwanted also may involve generating reports of messages that bounced or double-bounced.

In block 304, the Receiver reports, to the Service Operator, that the message is unwanted. Block 304 may involve use of any of several reporting mechanisms. For example, an enterprise Recipient or ISP may provide, in a graphical user interface that is used to view an e-mail in-box, a graphical button, clickable logo, clickable hyperlink, another selectable user interface widget for reporting unwanted messages. The widget may be labeled, e.g., "Report As 'Spam' To Bonding Organization." Alternatively, the Receiver may provide a specified address for a Recipient to forward unwanted messages, reports of bounced or double-bounced messages, messages sent to accounts that have not opted-in to receive commercial e-mail, etc. A Receiver may accumulate or collect such reports and submit the reports in a batch to the Service Operator.

In one embodiment, a report that a message is unwanted comprises a source address value, sender identification, Recipient identification, and information identifying the claimant of a fine, or the reporting party. The source address value, sender identification, and Recipient identification may be obtained by the reporting party from the message. The information that identifies the claimant of a fine may comprise a Receiver identifier that the Receiver obtained from the Service Operator as part of registering with the Service Operator.

Use of the system does create a risk that end users will falsely report that messages are unwanted, in order to maliciously generate a financial claim against the sender. To detect or deter such false reports, in one embodiment, a verification step is provided, as indicated by block 306. For example, block 306 may involve displaying a dialog box to the user that states, "You indicated that a message is unwanted. Please click below to verify." Alternatively, such a message may be provided in an e-mail message that is directed to the Receiver and that is automatically generated in response to receiving a report of an unwanted message.

In one embodiment, block 306 involves Message Processing System 106 performing one or more statistical tests on each message that is reported to be unwanted. The statistical tests seek to identify signature text in the messages that indicate that the messages are unwanted. Alternatively, users may be classified in one of a plurality of trust levels. The trust level associated with a user may determine what tests are applied to determine if a message is actually unwanted. In the encryption approach described further herein, use of an encrypted token provides non-repudiation of a message, and prevents a malicious party from falsely contending that it is entitled to a fine for a message that was never sent.

Alternatively, other security approaches may be used to promote non-repudiation. For example, SMTP authentication messages may be used to verify the sender of a message, headers with TXT white list record data included, etc.

In block 308, the Service Operator determines whether to impose a penalty. In one embodiment, determining whether to impose a penalty involves determining that a report of an unwanted message has been received, and that the sender of the unwanted message is associated with one or more instances of failure to conform to Bonded Sender principles. For example, the sender may have previously sent undeliverable mail, undeliverable mail that generated a bounce message, or may fail to provide an unsubscribe mechanism for its users. In another embodiment, determining whether to impose a penalty involves determining whether the Sender has exceeded an allowable complaint rate from all receivers or a particular Receiver. For example, an allowable complaint rate may be one complaint per million messages sent by a Sender, but two or more complaints would exceed the allowed rate.

If the test of block 308 is affirmative, then in block 310 the Service Operator penalizes the Sender. Block 308 may involve penalizing the Sender using any of the approaches described in Section 2.6 hereof, including debiting the Sender by a fixed amount for every complaint in excess of the complaint rate, debiting a variable amount according to message volume, etc.

Senders may elect to use bonded message sending for all messages, or for selected messages based upon internal criteria, economies of scale, etc. If a Sender elects not to send a bonded message, then such messages are subject to the problems outlined in the Background section hereof. Enterprises can bond outbound enterprise messages to reduce the likelihood that legitimate messages are inadvertently blocked.

Thus, embodiments herein provide a means for Senders to financially bond selected e-mail to ensure that it is delivered to the Recipient's In-box, and not blocked or stored in a Bulk folder by an anti-"spam" filter or similar technology. Embodiments also enable e-mail Receivers to ensure that messages desired by Recipients are not blocked or stored in Bulk folders as a result of a "false positive" determination by an anti-"spam" filter or similar technology. Embodiments also provide a mechanism for Receivers to ensure that financial penalties are enforced against Senders who post a bond and then send unwanted messages.

2.3 Encrypted Token Approach for Advertising Message Source

In one approach, represented by block 204A of FIG. 2A, a Sender advertises one or more network addresses from which it sends bonded messages. In this context, "advertisement" may consist of registering the Bonded Sender source address in a database that is maintained by the Service Operator. Alternatively, as in block 204B, each Sender includes, in each bonded message, a specified message header that identifies the message as a bonded message.

Figure 4:
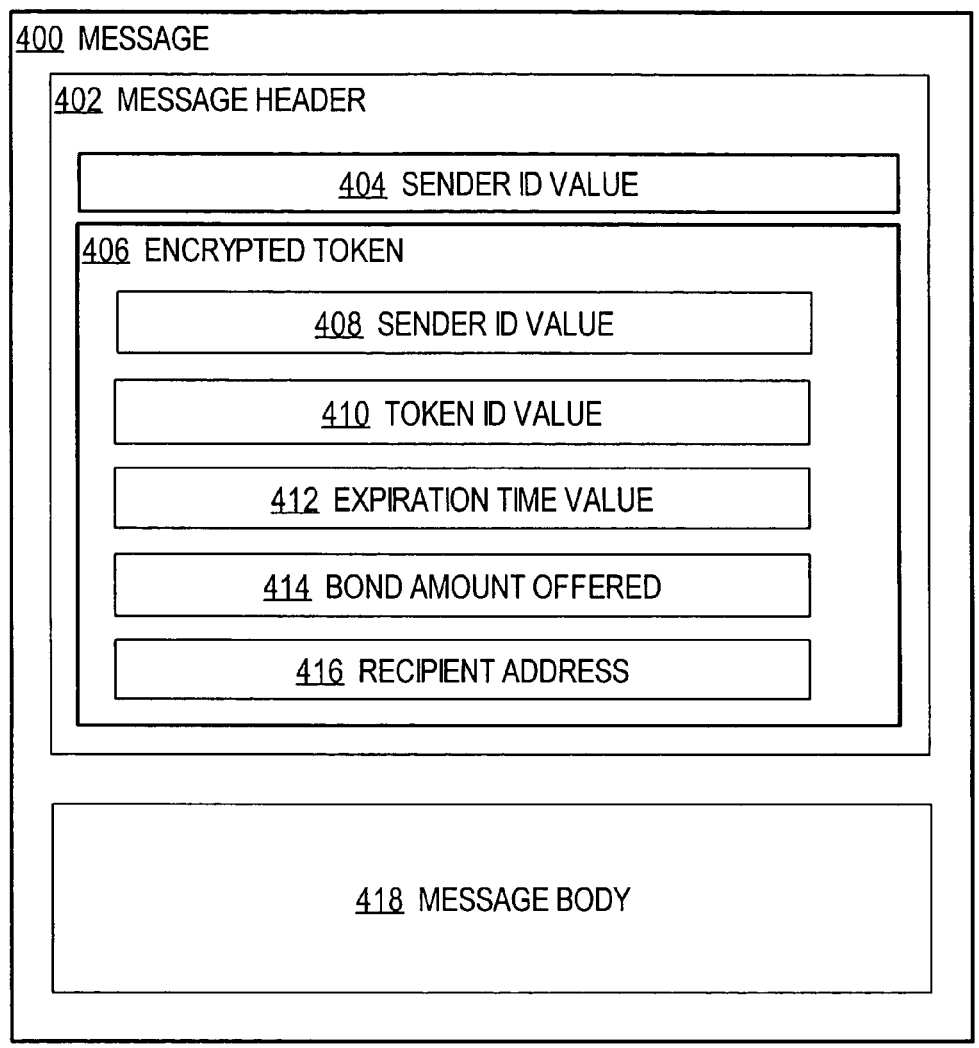
FIG. 4 is a block diagram of a message.

FIG. 4 is a block diagram of an electronic message that uses an encrypted message header approach. Message 400 generally comprises a message header 402 and a message body 418. The message header 402 may be specially designated. For example, a Sender may include a header designated as an "X-BSP" header in the message. For purposes of illustrating a simple example, message 400 is illustrated as having only the message header 402 and message body 418. However, in a practical embodiment, the message may include any number of other headers for appropriate purposes, such as SMTP headers, MIME headers, etc.

In the embodiment of FIG. 4, message header 402 comprises a sender identifier ("ID") value 404 and an encrypted token 406. The sender ID value uniquely identifies the Sender of the message 400 from among all Senders. A plaintext version of encrypted token 406 comprises a sender ID field 408, token ID 410, expiration time value 412, and bond amount offered 414.

Token 406 also includes a Recipient address value 416.

Sender ID field 408 is the same value as sender ID value 404, and is provided for non-repudiation purposes. Token ID value 410 uniquely identifies the current token from among all tokens that have been issued with the same sender ID value and the same expiration time value. Expiration time value 412 specifies a maximum time during which a Receiver may report the associated message as unwanted and thereby attempt to penalize the Sender for sending an unwanted message.

The bond amount offered 414 is an amount of value that is offered or promised by the Sender as a penalty against the Sender if the message is identified as unwanted by a Recipient.

In one embodiment, token 406 is encrypted using public key cryptography principles. For example, token 406 is encrypted with a private key that is associated with a corresponding public key that is registered with the Service Operator.

A Receiver of an e-mail message in the format of FIG. 4 obtains the sender ID and token from the message header. The Receiver then verifies the message according to one of several approaches.

Figure 5A:
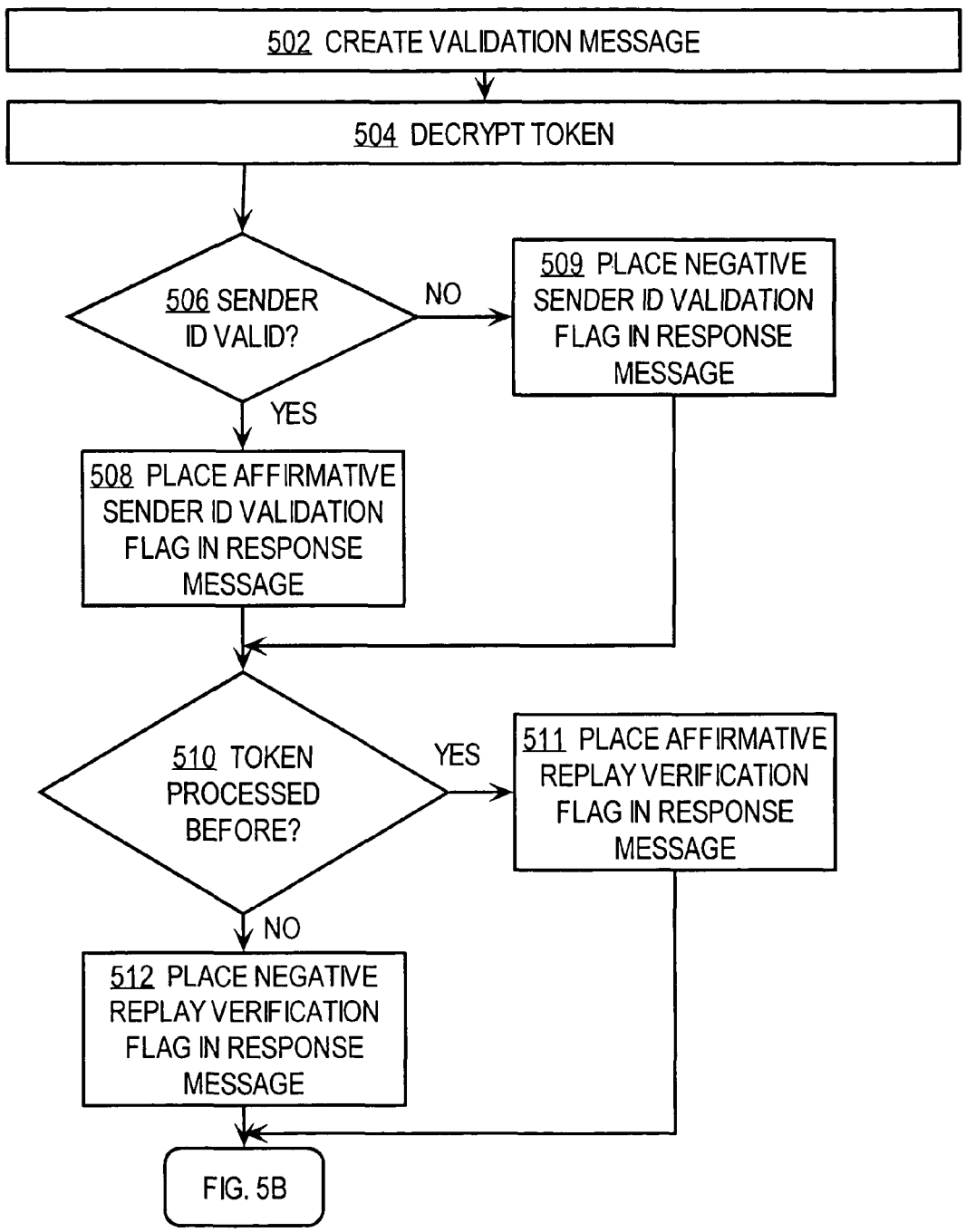
FIG. 5A is a flow diagram of a message verification approach.
Figure 5B:
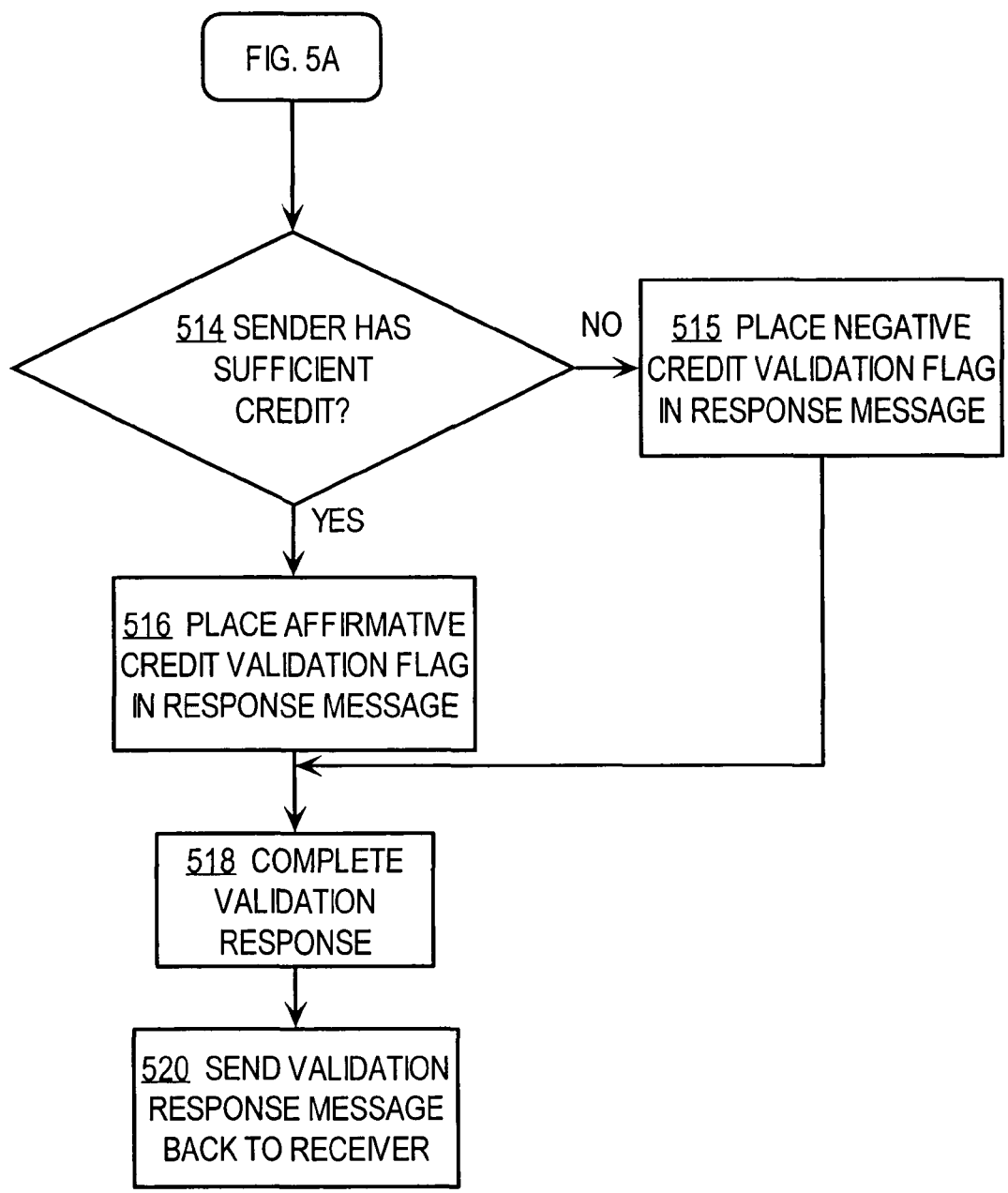
FIG. 5B is a flow diagram showing additional steps in the method of FIG. 5A.

FIG. 5A is a flow diagram of a message verification approach, and FIG. 5B is a flow diagram showing additional steps in the method of FIG. 5A. In block 502, the Receiver creates a validation message comprising the sender ID and token and submits the message to the Service Operator for validation. In block 504, the token is decrypted. In blocks 506-516, described further below, the Service Operator performs a series of tests on values obtained from the decrypted token, and places result indicators in a validation response message that is ultimately sent back to the Sender.

Referring now to block 506, the Service Operator tests whether the sender ID is valid. For example, block 506 involves testing whether sender ID value 408, obtained from the decrypted token, matches the sender ID that the Receiver provided in its validation message. If so, then in block 508 the Service Operator places an affirmative sender ID validation flag, or similar value, in the response message. If there is no match, then in block 509 a negative sender ID validation flag is placed in the response message. Alternatively, different flagging or signaling operations may be performed such that the Service Operator provides verification that the token was indeed created by the Sender.

In block 510, the Service Operator determines whether it has previously processed the same token. For example, block 510 may involve looking up token ID value 410 in a table or mapping that is maintained by the Service Operator. The table or mapping stores previously processed token identifiers, in association with corresponding sender ID values and expiration time value. If no matching token ID value is found, then the test of block 510 has a negative result. If a matching token ID value is found, then the test of block 510 has a positive result.

If a negative result occurs, then in block 512, a negative replay verification flag is placed in the validation response message. If a positive result occurs, then in block 511 an affirmative replay verification flag is placed in the validation response message. Alternatively, other methods of signaling the result of block 510 may be used. Thus, the validation message provides a verification that the Service Operator has not seen the then-current token ID from the then-current Sender in any prior token having the same expiration time value.

Referring now to FIG. 5B, in block 514, a test is performed to determine whether the Sender of the message has sufficient credit, or funds on deposit, with the Service Operator to satisfy or cover all its outstanding obligations. For example, the Sender is required to have sufficient credit or funds on deposit to cover the full value of all bond amounts offered 414 associated with all messages 400 sent by that Sender for which the expiration time value 412 is unexpired, including the then-current message. The test of block 514 may be facilitated by querying a data table, maintained by the Service Operator, which tracks the total then-current potential penalty liability for each Sender.

If the Sender has sufficient credit or funds on deposit, then in block 516, an affirmative credit verification flag is placed in the response message. If the Sender has insufficient credit, then in block 515, a negative credit verification flag is placed in the response message.

In block 518, the validation response message is completed by the Service Operator. Block 518 may involve, for example, placing the expiration time value 412, the bond amount offered 414, and the Recipient address 416, all obtained from the decrypted token 406, in the validation response message.

In block 520, the validation response message is sent back to the original message Receiver. Subsequent processing by the Receiver is described further below.

FIG. 5B is a flow diagram of an alternative approach for validating a message. FIG. 5B represents process steps that are performed by a Receiver of a message in the format of FIG. 4. Such a Receiver may be an ISP, an enterprise, an individual end user, etc.

Figure 5C:
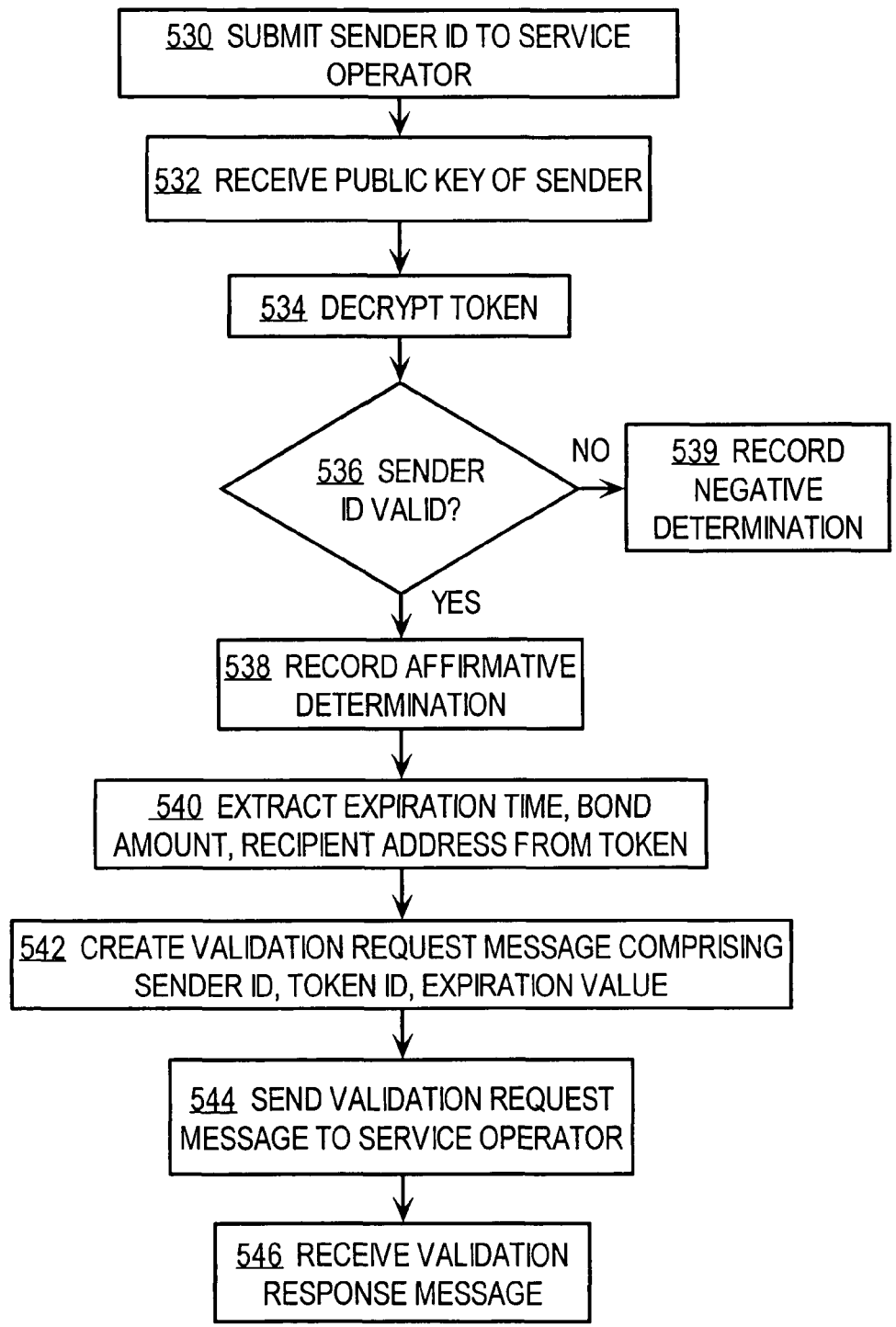
FIG. 5C is a flow diagram of a generating a validation message.

FIG. 5C is a flow diagram of a generating a validation message. In block 530, the Receiver extracts the sender ID value 404 from the message header 402 of a message 400. The Receiver submits the sender ID value 404 to the Service Operator in a request to provide the public key of the Sender. In response, the Service Operator looks up the public key of the Sender in a table, mapping or database maintained by the Service Operator, for example, using the sender ID value 404 as a lookup key or index.

In block 532, the Receiver receives the public key of the Sender, in a response message from the Service Operator. Using the public key, the Receiver can decrypt the token 406 in the message header 402, as shown by block 534.

In block 536, the Receiver tests whether the sender ID is valid. For example, block 536 involves testing whether sender ID value 408, obtained from the decrypted token, matches the Sender ID that the Receiver provided in its validation message. If so, then in block 538 the Receiver records data representing an affirmative determination. If there is no match, then in block 539 a negative determination is recorded by the Receiver. No specific data or recordation mechanism is required if the Receiver has a way to remember that it verified whether the token was indeed created by the Sender.

In block 540, the Receiver extracts the expiration time value, bond amount offered, and Recipient address from the decrypted token. In block 542, the Receiver creates a validation request message that includes the sender ID value, token ID value, and expiration time value from the decrypted token. In block 544, the Receiver sends the validation request message to the Service Operator.

In response, the Service Operator determines whether it has processed the same token before and whether the Sender has sufficient credit or funds on deposit to cover its then-current potential penalty liability, including any liability under the then-current message. Such responsive processing may involve the Service Operator performing the steps of blocks 510-520 of FIG. 5A.

In block 546, the message Receiver receives a validation response message from the Service Operator. The validation response message contains data indicating whether the Service Operator has seen the then-current token ID from the then-current Sender in any prior token having the same expiration time value, and whether the Sender of the message has sufficient credit, or funds on deposit, with the Service Operator to satisfy or cover all its outstanding obligations.

After carrying out either the approach of FIG. 5A or the approach of FIG. 5B, the Receiver may parse the validation response message, and based on the values contained in it, the Receiver may determine whether to forward the message to its named Recipient, to store the message in a bulk mail folder, to discard the message, etc. Different Receivers may establish, by policy, different responses for various values in the validation response message.

2.4 Determining Whether to Accept a Message

Figure 6:
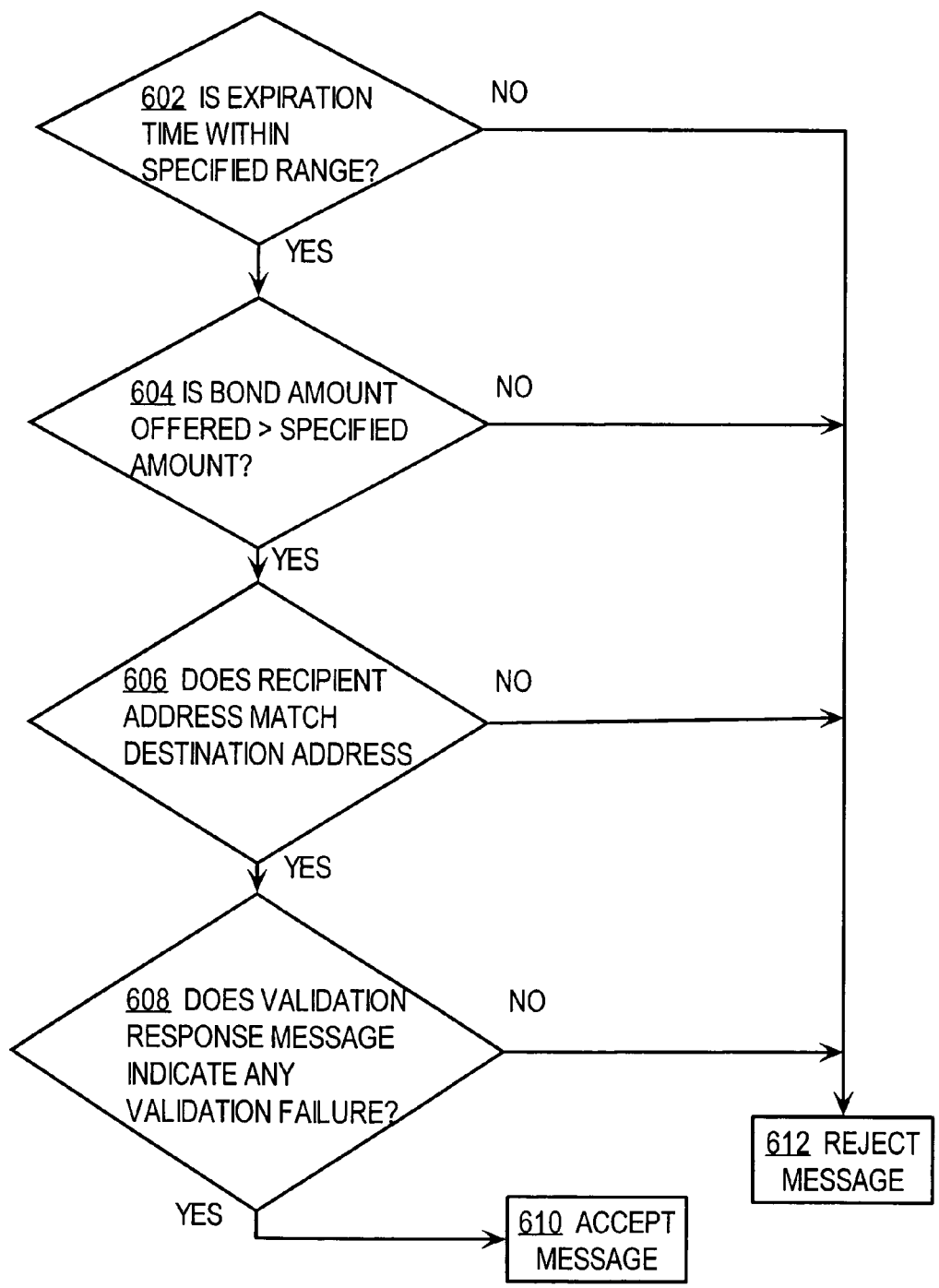
FIG. 6 is a flow diagram of validating a message.

FIG. 6 is a flow diagram of an example process for determining whether a received message is acceptable. FIG. 6 represents example process steps that are performed by a Receiver of a message after performing one of the approaches of FIG. 5A or FIG. 5B. Different Receivers may elect to perform fewer than all the steps shown in FIG. 6, or may elect to perform an entirely different process. In addition, the steps of FIG. 6 may be performed in any order.

In block 602, a Receiver determines whether the expiration time of a received message is with a specified range. For example, a Receiver may require that the expiration time value 412 of the then-current message is at least N days in the future, so that sufficient time is available to permit evaluation of the message, and possibly reporting of the message as unwanted, by the end-user or Recipient of the message. The value of N may vary widely depending on whether the Receiver is an individual end user, ISP, enterprise mail server, or other device or individual. For example, N could range from 1 to 120.

If the expiration time value is not within the specified range, then control transfers to block 612 in which the message is rejected. In this context, "rejecting" a message in block 612 may involve storing the message in a bulk mail folder, blocking the message, deleting the message, sending an automatic response to the Sender, etc. No specific rejection mechanism is required and each Receiver may elect, as a matter of policy, different processing mechanisms for different Senders, Recipients, or other circumstances.

In block 604, the Receiver determines whether the bond amount offered or promised by the Sender is greater than a specified amount. For example, the Receiver may require that bond amount offered 414 is at least D, where D is a specified value. The value of D may vary widely depending on whether the Receiver is an individual end user, ISP, enterprise mail server, or other device or individual. For example, D could range from $1 to $100, or equivalent amounts in other currencies. If the bond amount offered or promised is not within the specified range, then control transfers to block 612 in which the message is rejected.

In block 606, the Receiver determines whether the Recipient address matches the destination address of the message. For example, the Receiver compares the Recipient address value 416 to a destination network address found elsewhere in message header 402 or in another header, such as an IP packet header. If no match exists, then control transfers to block 612 in which the message is rejected.

In block 608, the Receiver determines whether the validation response message it received, as part of participating in either the approach of FIG. 5A or FIG. 5B, contains any indication of a validation failure. For example, the Receiver examines various flag values in the validation response message and determines whether a particular test of FIG. 5A, FIG. 5B failed validation. If so, then control transfers to block 612 in which the message is rejected.

If all the tests of block 602, 604, 606, 608 are successful, then control passes to block 610 in which the Receiver treats the message as "acceptably bonded." As part of such treatment, the Receiver may accept the message, place the message in an in-box associated with the Recipient, or perform other action.

2.5 Processing a Report of an Unwanted Message

Figure 7A:
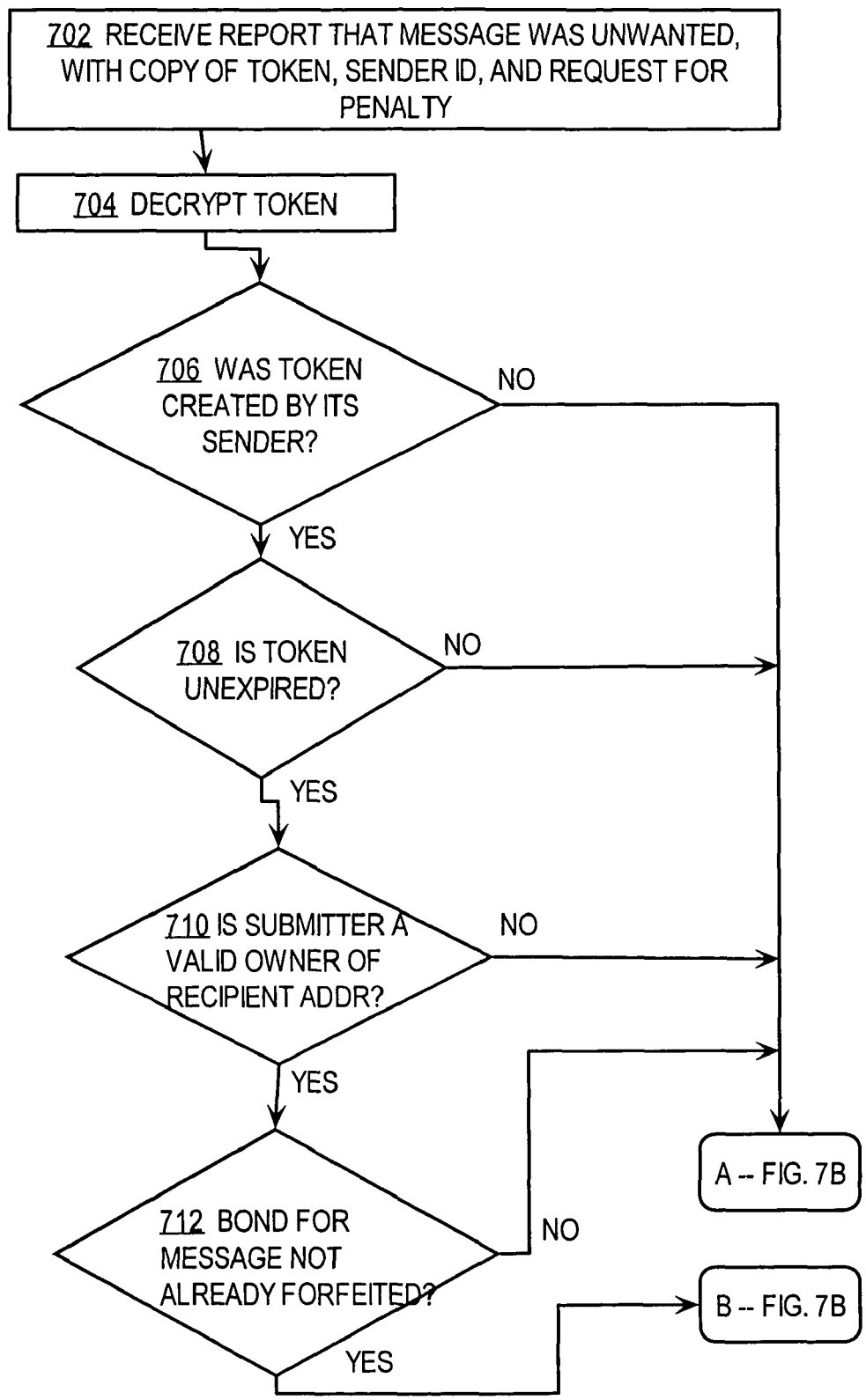
FIG. 7A is a flow diagram of verifying a report of an unwanted message.
Figure 7B:
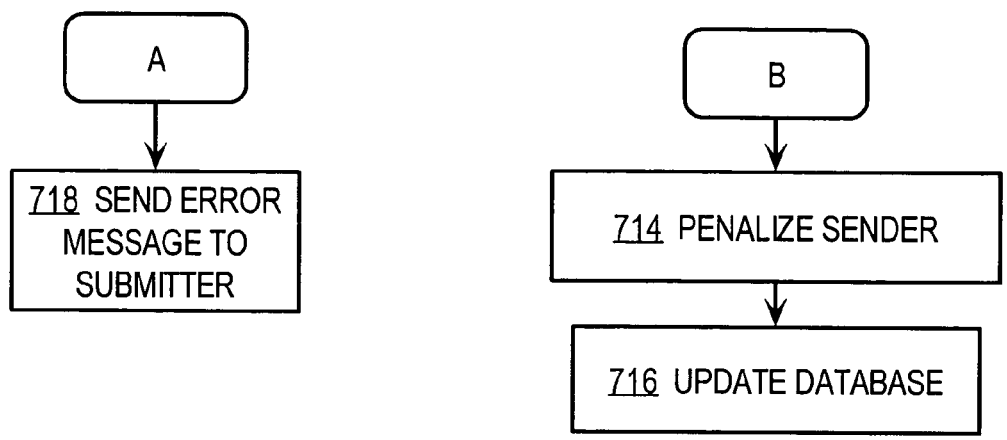
FIG. 7B is a flow diagram showing additional steps in the method of FIG. 7A.

FIG. 7A is a flow diagram of verifying a report of an unwanted message, and FIG. 7B is a flow diagram showing additional steps in the method of FIG. 7A. Such a report also may be termed a "complaint." Referring first to FIG. 7A, in general, if a Recipient determines that a message is unwanted, the Recipient forwards the message token to the Service Operator and requests the Sender to forfeit the bond. The Recipient may perform such a determination, for example, after receiving a message passed to it by a Receiver that has performed the process of FIG. 6. The Service Operator examines the token and other values to verify the request, and then determines whether to forfeit the bond.

Referring now to block 702, a report that a message was unwanted is received. In one embodiment, the report comprises a message from the Recipient to the Service Operator that includes sender ID value 404, encrypted token 406, and a request to forfeit the bond. The report or complaint also includes a network address of the Recipient, either within the complaint message or within a header of a packet that carries the message. For example, the conventional IP packet header carries the address of the sender of a packet. In response, the Service Operator decrypts the token, as shown in block 704. The Service Operator then performs a series of tests on values in the token and relating to the Submitter.

In block 706, the Service Operator determines whether the token was actually created by the original message Sender. For example, the Service Operator compares sender ID value 408 from the decrypted token to sender ID value 404. If there is a match, then the identified Sender is known to have created the encrypted token. An encryption approach for encrypting token 406 is selected so that it is impractical for a malicious Sender to create a false token, or to decrypt a token and learn the sender ID value 408 therein.

If the test of block 706 is negative, then control passes to block 718 (FIG. 7B), in which the Service Operator sends an error message to the Submitter of the forfeiture request. In this context, sending an error message may include sending an advisory message to the Submitter indicating that the bond will not be forfeited. It may also include sending a warning message to the Sender of the message and recording these actions in a log or other database.

In block 708, the Service Operator determines whether the token is unexpired. Block 708 may involve examining expiration time value 412 and comparing it to a master clock or time value. The time values may be expressed in Greenwich Mean Time, or Service Operator optionally may perform one or more time zone conversion operations. If expiration time value 412 has passed, then control passes to block 718.

Otherwise, in block 710, the Service Operator determines whether the Submitter of the forfeiture request is a valid owner of the address to which the message is directed. For example, the Service Operator examines Recipient address value 416 in the decrypted message token 406 and determines whether the Submitter owns the address. The Service Operator may determine valid ownership by comparing the recipient address value 416 to the known network address of the recipient, based on an address value in the complaint message or a header of the complaint message. In this context, determining ownership includes determining whether a party is a valid proxy for an address. Thus, the use of a recipient address identifier in token 406 of message 400 prevents a malicious user from spoofing complaints about unsolicited messages by essentially requiring a complaining party to prove that a sender identified in a complaint actually sent the message to the complaining party. For example, a malicious user could prepare software that would automatically generate a large number of identical complaints. However, if the test of block 710 determines that recipient address value 416 does not match an actual address of the recipient, then a fraudulent complaint may be suspected, and control passes to part A of FIG. 7B, which performs error processing.

In block 712, the Service Operator determines whether the bond amount for the then-current message is not already forfeited. For example, block 712 involves determining whether the bond represented by the then-current token 706 has been forfeited, by checking looking up the token based on its expiration time value and token ID value in a database of forfeited bonds that is maintained by the Service Operator. If the bond associated with the token has been forfeited previously, then control passes to block 718 (FIG. 7B).

Referring now to FIG. 7B, if all the tests of block 706, 708, 710, 712 are affirmative, then in block 714, the Sender is penalized. Any of the approaches of Section 2.6 may be used. In block 716, the Service Operator updates its database with information relating to the penalty.

The tests shown in FIG. 7 may be performed in any order. Further, a Service Operator may elect, as a matter of policy, to perform other tests.

In addition, the process of FIG. 7 may be supplemented with a dispute resolution process that addresses allegedly fraudulent reports of unwanted messages, or reports issued by allegedly fraudulent Recipients.

2.6 Penalizing Senders

Figure 8:
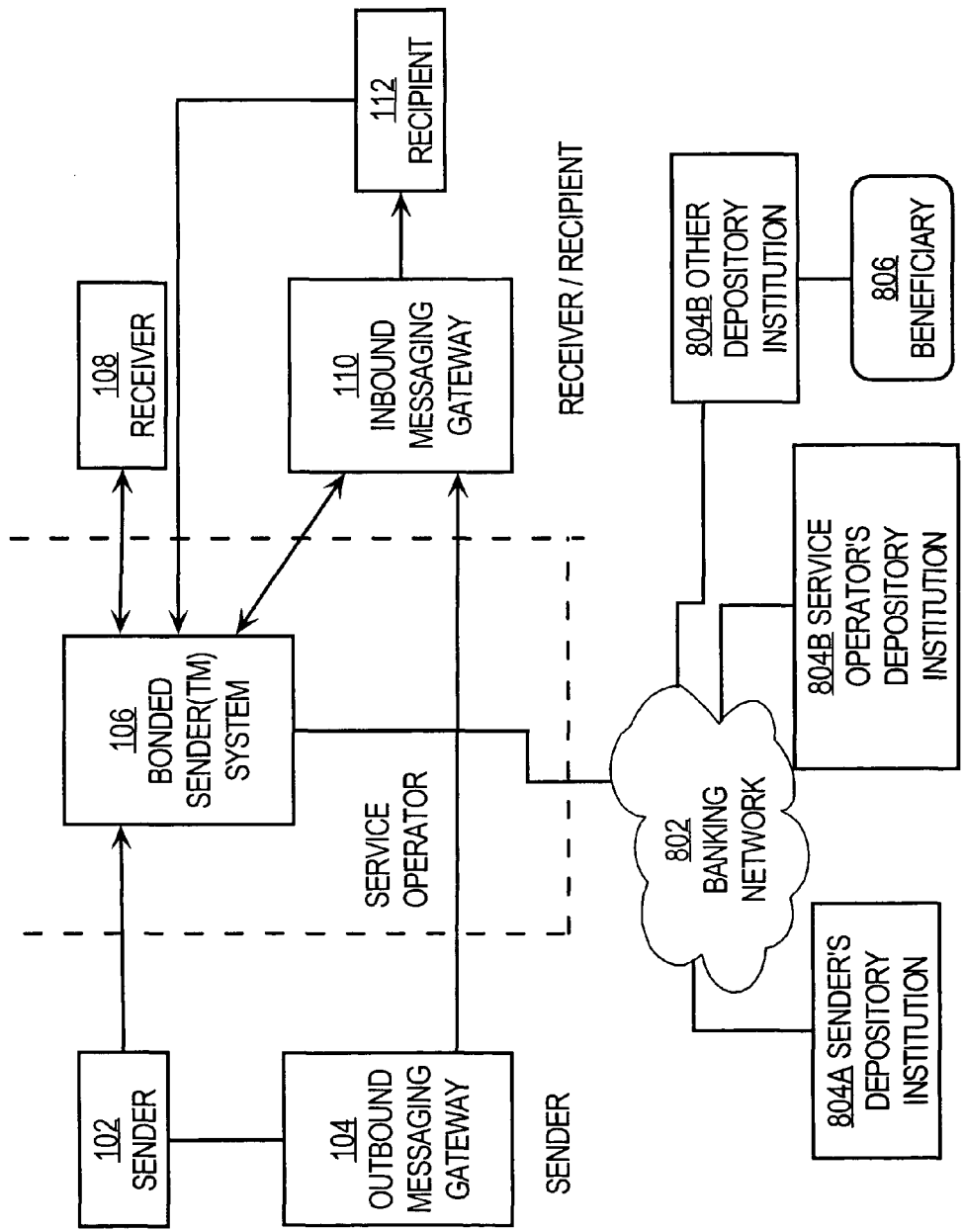
FIG. 8 is a block diagram of a banking network and related elements in relation to the system of FIG. 1A.

The Service Operator may penalize a Sender who sends a message that is designated as bonded but that constitutes "spam" based on any of several approaches. FIG. 8 is a block diagram of a banking network and related elements in relation to the system of FIG. 1A that may be used in certain approaches. The elements of FIG. 8 are not required for any particular embodiment.

Message Processing System 106 is communicatively coupled directly or indirectly to a banking network 802. One or more depository institutions, such as a Sender's depository institution 804A, Service Operator's depository institution 804B, and other depository institution 804C, are coupled to network 802. Each depository institution 804A, 804B, 804C comprises a bank, thrift, or other institution that receives and holds private funds in designated accounts, such as a securities brokerage, etc. Sender's depository institution 804A holds an account owned by a Sender; Service Operator's depository institution 804B holds an account owned by the Service Operator; and the other depository institution 804C holds one or more accounts that are owned by a Receiver, or a Recipient, or a third-party beneficiary 806.

In one embodiment, penalizing a Sender involves causing the Sender to forfeit all or a portion of a bond that the Sender has posted with the Service Operator. If the Sender has posted a bond with the Service Operator, then forfeiture may comprise performing an electronic funds transfer. For example, the Service Operator causes the Sender to forfeit an amount of value equal to the bond amount that was offered by the Sender in the message token. This may involve transferring funds from an account in Service Operator's depository institution 804B, owned by the service provider and containing funds placed on deposit by the Sender, to an account at the other depository institution 804B or to a designated party.

If the Sender has not posted a bond, then penalizing the Sender may involve the Service Operator issuing an invoice to the Sender. In response, the Sender may issue, to the Service Operator, a check or draft drawn on an account in Sender's depository institution 804A. Thereafter, or concurrently, the Service Operator may transfer funds to a Receiver, Recipient, or beneficiary.

In certain embodiments, the penalty amount imposed on a particular Sender for a plurality of identical "spam" messages is capped at a specified maximum penalty value. For example, the Service Operator may penalize the Sender a maximum of $10,000, or some other specified amount, even if millions of identical "spam" messages are sent and only a few "spam" reports are received from Recipients. Alternatively, the penalty amount is tiered, such that the penalty amount increases as specified numbers of "spam" reports are received, or tiered based on the number of "spam" messages that were sent.

Penalizing a Sender also may involve determining how to split the fine among one or more parties and distributing funds to such parties, manually or using electronic funds transfers or similar mechanisms. For example, funds, monetary value, or other elements of value representing a penalty against the Sender may be transferred from the Sender, or an account associated with the Sender, to the Service Operator, to a network administrator, to the Receiver, to the Recipient, to the Receiver as a credit for the benefit of an account held at the Receiver by the Recipient (e.g., an end user account with an ISP), to a third-party beneficiary such as charitable entity, etc.

2.7 Estimation Approaches

In certain embodiments, an amount of the bond that is placed in block 202 of FIG. 2A, or an amount of the fine that is reserved in block 215 of FIG. 2B, or an amount of a penalize applied to a sender at block 310 of FIG. 3, may be automatically determined using estimation approaches that take into account a number of receiver complaints that are likely to be received for the then-current sender.

Figure 10A:
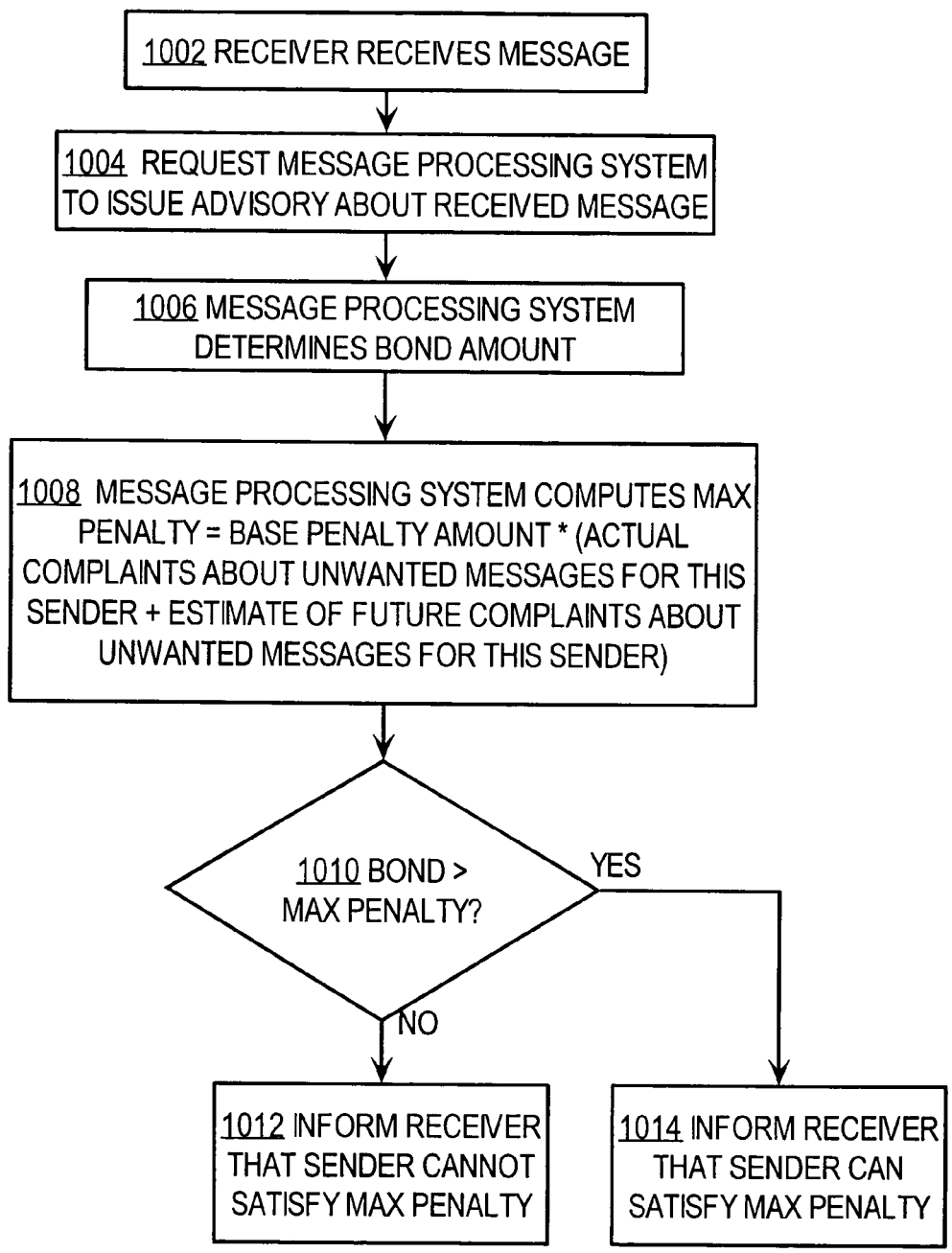
FIG. 10A is a flow diagram of a first process for messaging processing using an estimation approach.

FIG. 10A is a flow diagram of a first process for messaging processing using an estimation approach. The process of FIG. 10A may be performed by message processing system 106 of FIG. 1A in response to a query from inbound messaging gateway 110. In block 1002, a receiver such as a message gateway receives a message directed to a recipient. In block 1004, the receiver requests a message processing system to issue an advisory about the received message.

In block 1006, the message processing system determines an amount of a bond that has been offered by a sender of the message for all messages that it sends. For example, block 1006 may involve decrypting an encrypted token prepared by the sender of the message that contains a proposed bond amount. In this approach, the offered amount is a total bond amount rather than an amount for a single message.

In block 1008, the message processing system computes a maximum penalty amount that could be applied to the sender if many or all of its messages are reported as unwanted by receivers. The maximum penalty is computed as a base penalty amount multiplied by the sum of (a) a number of complaints about unsolicited messages that are actually received from senders and (b) an estimate of a number of complaints that are not yet made or never made by receivers ("un-filed complaints").

In block 1010, the message processing system 106 compares the offered bond amount from the message to the maximum penalty that was computed in block 1008. If the message processing system determines that the difference of the bond amount and the penalty amount so computed is greater than zero, then the message processing system informs the inbound messaging gateway 110 that the sender can satisfy the maximum possible penalty, i.e., that the sender remains bonded, as shown in block 1014. In response, the inbound messaging gateway 110 forwards a received message to recipient 112. Alternatively, if the difference is zero or less, then in block 1012 message processing system 106 may inform the gateway 110 that the sender could not satisfy the maximum anticipated penalty. The gateway 110 then may request message processing system 106 to penalize the sender, block forwarding of the message to the recipient 112, etc.

Figure 10B:
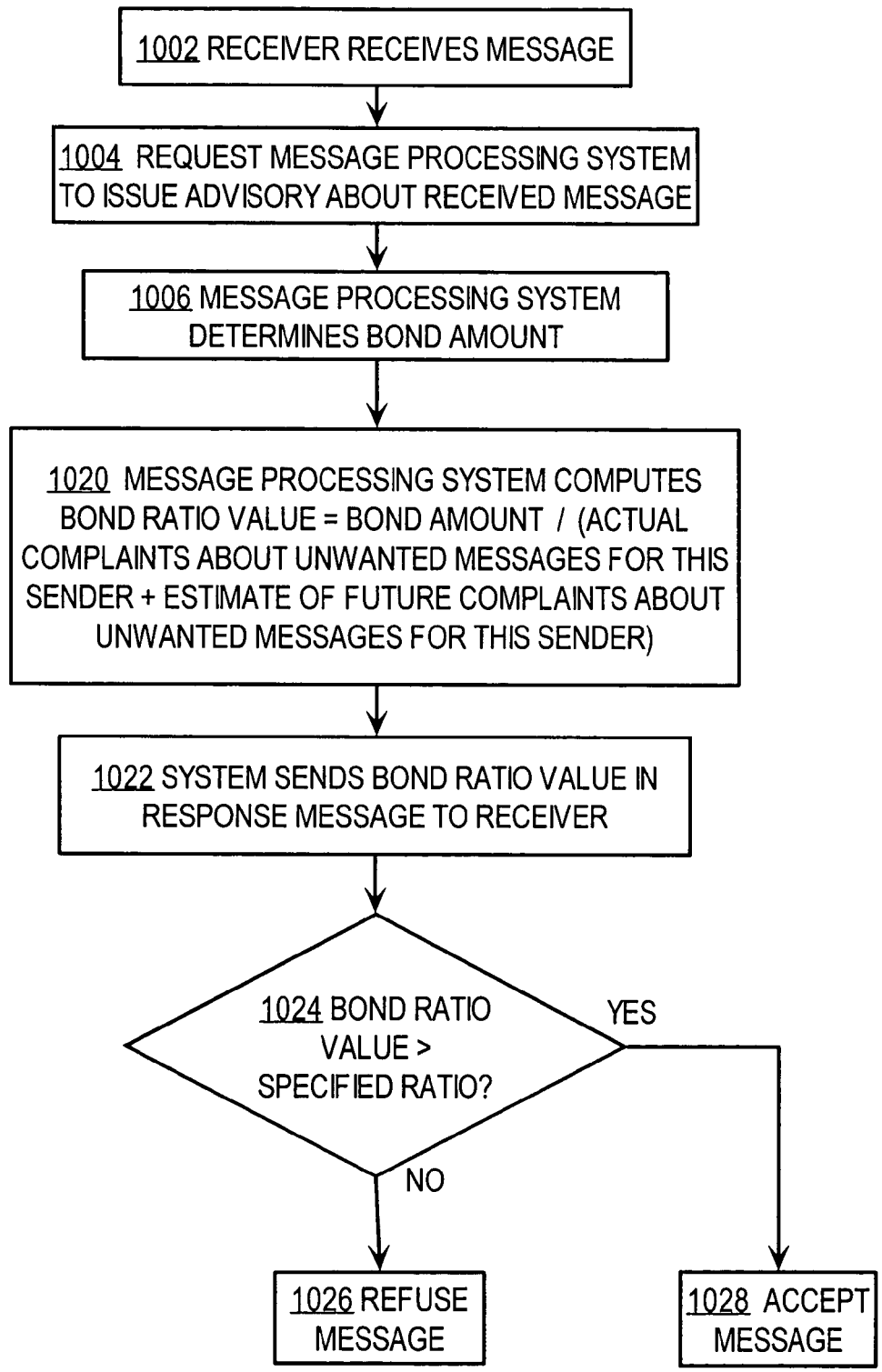
FIG. 10B is a flow diagram of a second process for messaging processing using an estimation approach.

FIG. 10B is a flow diagram of a first process for messaging processing using an estimation approach. In this approach, block 1002, 1004, and 1006 involve the same steps as in FIG. 10A. However, in block 1020, the message processing system computes a bond ratio value as the bond amount offered or posted by a sender, divided by a sum of a number of complaints about unwanted messages that are actually received from senders and an estimate of a number of complaints that are not yet filed or never filed by receivers.

Each inbound messaging gateway 110 that accesses message processing system 106 is assumed to establish and store a specified minimum bond ratio amount. At block 1022, the message processing system informs receiver, such as the inbound messaging gateway 110, of the computed bond ratio value. At block 1024, the inbound messaging gateway 110 determines whether the computed bond value is equal to or greater than the specified minimum bond ratio amount of that gateway. If so, then the gateway 110 accepts and forwards the received message to the recipient 112, at block 1028. If not, then at block 1026 the gateway may refuse the message, request message processing system 106 to penalize the sender, block forwarding of the message to the recipient 112, etc.

The bond ratio value approach provides added flexibility to receivers, because each inbound messaging gateway 110 among a number of gateways associated with different receivers can set its own specified minimum bond ratio value. For example, one ISP may require that all senders have a bond ratio value of at least 10, and another ISP could require a minimum ratio of 20. Therefore, receivers can customize, to an extent, the operation of message processing system 106.

Further, the bond ratio value approach enables a receiver to determine how a first Sender compares in relative terms to a second Sender with respect to actual complaints, rather than simply knowing whether the first Sender can withstand a particular penalty amount as in the approach of FIG. 10A. For example, a receiver could derive a rating for a particular Sender based on the bond ratio values that are determined. The bond ratio value may be viewed as a sender experience value or rating.

Still further, the bond ratio value does not incorporate a penalty amount. Thus, the use of a bond ratio value provides a way to apply a negative experience rating to a Sender, without actually requiring the Sender to post a bond in advance and without actually debiting funds from or imposing a specific financial penalty on the Sender. For example, as an alternative to reserving a fine at block 215 of FIG. 2B, a bond ratio value of the Sender is re-computed and stored. Similarly, at block 218, the bond ratio value of the Sender may be re-computed to reflect a negative experience with the Sender. In another example, penalizing a Sender at block 310 of FIG. 3 may involve re-computing and storing the bond ratio for the Sender without actually imposing a financial penalty on the Sender. The re-computation of a bond ratio also may be performed at block 520 of FIG. 5B to take into account the values of the sender, reply, and credit validation flags; or at block 610, 612 of FIG. 6; or at block 714 of FIG. 7 As the bond ratio worsens, the Sender loses the ability to send messages through gateways that are in contact with message processing system 106.

In either of these approaches, a computation of an estimate of a number of complaints that are not yet filed or never filed by receivers is performed. The computation may be performed using several mechanisms. For example, an estimate may be determined based on volume of messages sent, by selecting an estimate value from a mapping of estimate values to volume levels. Using that mechanism, a Sender who sends 1,000,000 messages in a specified window of time, e.g., 24 hours, could be assigned an estimated number of complaints of 100. Alternatively, if a Sender sends 10,000,000 messages in a 24-hour period, the message processing system 106 may assume that 1,500 complaints will be received in the future. A specified time window is used because recipients need a certain amount of time to receive, read and evaluate received messages, so a delay of at least several hours to several days could elapse between sending a message and receiving a complaint.

In a variation of this approach, the estimated number of complaints could be scaled according to a length of the time window. For example, if the time window is 3 days, then one complaint rate might be applied to the first 24 hours, a second different rate to the second 24 hours, and a third different rate to the third 24 hours, and these three rates may be blended to arrive at an average complaint rate that is multiplied by the message volume to result in a final estimate of complaint volume.

These approaches address the potential problem of how to process a Sender that is newly bonded and immediately sends a large volume of messages. Since such a Sender has no historical actual complaint rate, better operation of message processing system 106 and better satisfaction of receivers is expected if some number of complaints is assumed or estimated for a given volume of sent messages.

Alternatively, an estimate may be provided by counting an actual number of complaints over a specified window of time, resulting in a historical complaint rate. The estimate may apply a scaling value to the historical complaint rate in order to correlate the complaint rate to the actual number of messages sent by a sender.

2.8 Example Interface for Querying a Service Operator

A Service Operator may use a DNS query/response syntax similar to RBL (realtime black list) style DNS systems. In such an interface, the octets of a Sender's IP address, in its dotted-quad form, may be reversed and combined with the Service Operator's domain to form the query. For example, if a Sender's IP address is 192.168.1.2, and the Service Operator's domain is "query.bondedsender.org", then the query sent to the Service Operator may be "2.1.168.192.query-.bondedsender.org." The Receiver may submit the query to the Service Operator. In one embodiment, using DOS or Unix, the command-line query may take the form:

nslookup 2.1.168.192.query.bondedsender.org

In one embodiment, in the context of FIG. 1B, the DNS Server 126 handles the query. If the IP address is in the list of Bonded Senders, the DNS Server 126 may return a particular IP address, such as 127.0.0.10. If the address is not registered as a Bonded Sender, the DNS Server 126 will indicate that the name is invalid.

3.0 Activating and Deactivating Senders

Figure 11:
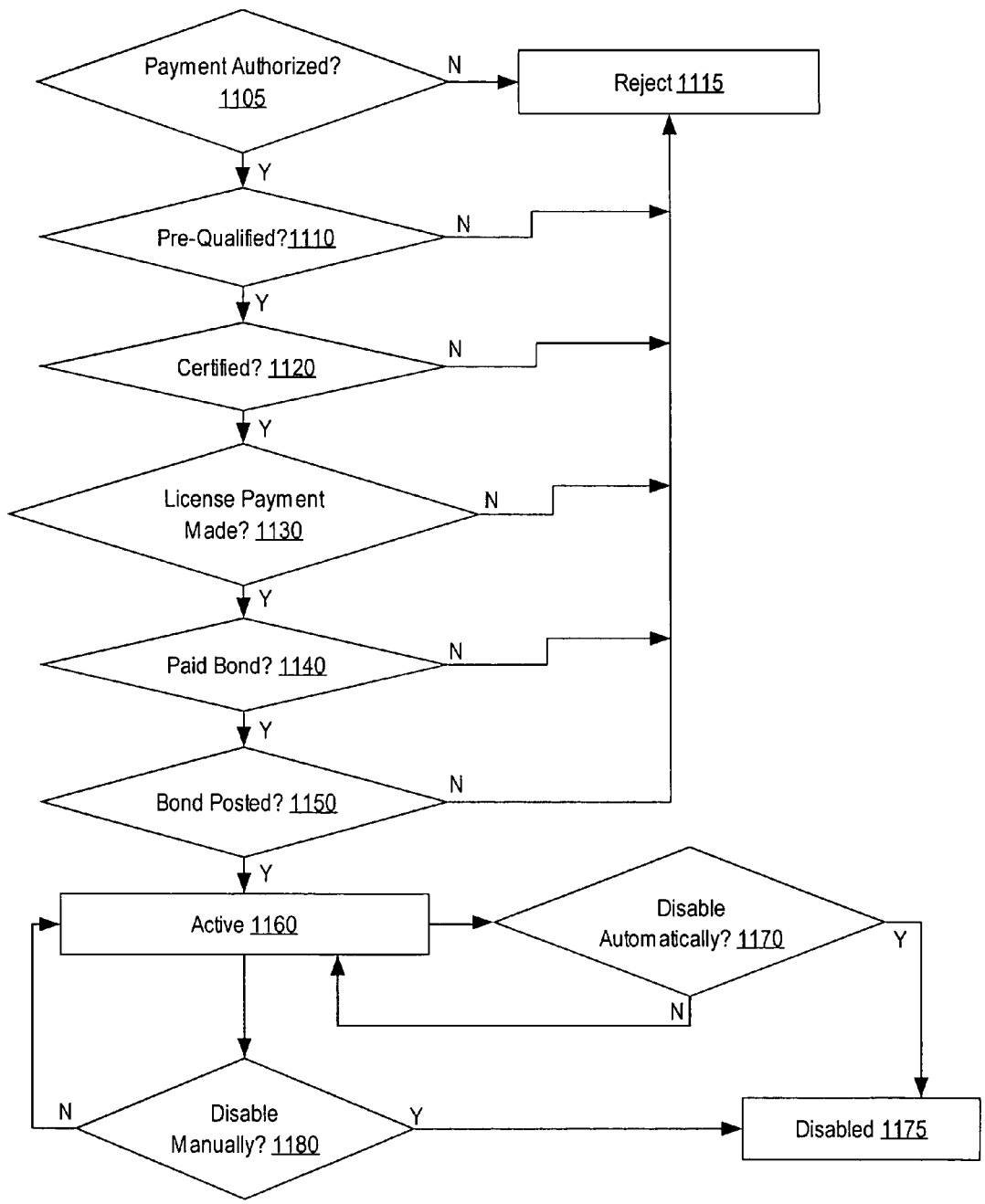
FIG. 11 is a flow diagram that depicts the process of activating and deactivating a sender.

FIG. 11 is a flow diagram of a process of activating and deactivating a sender. The process of FIG. 11 may be used to determine whether a particular sender qualifies to use the system, to periodically determine whether senders should maintain use of the system, etc. In one embodiment, the steps 1105-1160 are performed as part of step 202. In various embodiments, steps 1170 and 1175 are performed as part of steps 212, 514, 540, 706, 708, 712, 714, 716, 1006, 1008, 1010, 1012, 1014, 1020, 1022, 1024, or any other appropriate step. Alternatively, any of steps 1105-1108 may be performed independent of any of the steps described herein.

In step 1105, a check is performed to determine whether payment from a sender is authorized. Before and while the determination is made, the sender may be associated with a Pending Payment Authorization state. Associating a sender with a state may comprise storing a record in a machine-readable medium, database, or any other appropriate means. In various embodiments, the payment authorization checked in step 1105 is for payment of fees for processing an application, service fee, subscription fee, certification fee, annual license, payment of a bond, or any other appropriate charge. In one embodiment, determining whether a payment from a sender is authorized includes receiving payment information and charging the sender based on the payment information. The payment information may include credit card information, bank account information, or any other appropriate information. Determining whether a payment is authorized may also include receiving a credit card authorization for the appropriate amount of money; receiving confirmation that an account transfer for the appropriate amount has been completed, or receiving other appropriate payment confirmation information. Alternatively, determining whether a payment is authorized may include receiving information that payment for the appropriate amount will not be received.

If the payment for the sender is not authorized, then the sender is rejected in step 1115. In one embodiment, if the sender is rejected, the sender is associated with an appropriate rejection state. The appropriate rejection state may depend on the steps through which the sender has already been processed and may include the states Payment Authorization Rejection, Pre-Qualification Rejection, Certification Rejection, License Payment Rejection, Bond Payment Rejection, Bond Posting Rejection, or any other appropriate state. States may also be called statuses. Rejecting the sender may include sending an email, calling the sender, sending postal mail, or any other appropriate communication of the occurrence of or reasons for the rejection. Rejection may involve placing the sender in a suspended state to determine whether the sender can successfully provide payment authorization within a specified time period.

If the payment is authorized in step 1105, then in step 1110, a check is performed to determine whether the sender is pre-qualified. Before and while the determination of whether the sender is pre-qualified is made, the sender may be associated with a Pending Pre-Qualification state. The checks performed to determine whether the sender is pre-qualified may include any appropriate checks such as length of time in business of the sender, the volume of messages seen from or sent by the sender, message complaint sending history of the sender, credit history of the sender, industry or industries with which the sender is associated, or any other appropriate information. For example, a sender may not be pre-qualified if it has been in business less than one month or if the business has had over a certain pre-defined number of complaints within the past year. If the sender is not pre-qualified, then the sender is rejected in step 1115 and may be associated with a Pre-qualification Rejected state.

If the sender is pre-qualified in step 1110, then in step 1120, a check is performed to determine whether the sender is certified. Before and during step 1120, a sender may be associated with a Pending Certification state. The check performed during certification may include an audit of the sender and websites associated with the sender to determine the privacy policies of the sender, how the sender collects names for its email list, whether the sender has opt-in or opt-out message lists, ease of opting out of message lists on the sender's website, whether the sender sells addresses to other senders, and any other appropriate check. In one embodiment, a third-party service performs the audit of the sender and the websites associated with the sender. In a related embodiment, TRUSTe performs the audit. Information about TRUSTe can be found on the Internet at www.truste.org. If the sender is not certified in step 1120, then the sender is rejected in step 1115 and may be associated with a Certification Rejected state.

If the sender is certified in step 1120, then in step 1130, a check is performed to determine whether the license payment has been made. Before and during step 1130, the sender may be associated with a Pending License Payment state. In one embodiment, the license payment is made as part of fee payment (step 1105) or bond payment (step 1140) and step 1130 is performed in conjunction with step 1105 or step 1140. In one embodiment, determining whether the sender has paid the license payment includes receiving an indication from the sender of a license payment by the sender. The confirmation of license payment may come in the form of an appropriate increase in the monetary balance in an account associated with the sender, the receipt of a guaranteed check, cash, or other legal tender from the sender, the receipt of a deposit confirmation from the sender, the uploading of transaction information by the sender, or any other appropriate information. If the license payment is not made (step 1130) within a certain predefined period of time, then the sender is rejected in step 1115 and may be associated with a License Payment Rejected state.

If the license payment is made in step 1130, then in step 1140 a check is performed to determine whether the sender has paid a bond. Before and during step 1140, the sender may be associated with a Pending Bond Payment state. In one embodiment, determining whether the sender has paid a bond includes receiving an indication from the sender of a bond payment by the sender. The confirmation of bond payment may come in the form of an appropriate increase in the monetary balance in an account associated with the sender, the receipt of a guaranteed check, cash, or other legal tender from the sender, the receipt of a deposit confirmation from the sender, the uploading of transaction information by the sender, or any other appropriate information. In one embodiment, if the bond payment is not confirmed within a predetermined period of time in step 1140, then the sender is rejected in step 1115 and may be associated with a Bond Payment Rejected state.

If the bond payment is received or confirmed in step 1140, then in step 1150 a check is performed to determine whether the bond has been posted. Before and during step 1150, the sender may be associated with a Pending Bond Post state. In various embodiments, checking to see whether a bond has been posted includes receiving confirmation that an account associated with the sender that is accessible for payment of penalties contains a sufficient amount of money. In various embodiments, this confirmation may include receiving information from a bank, holding corporation, or other appropriate entity, that the funds for the bond have cleared and are available for use in paying any penalties associated with the sender's transmission of messages. In one embodiment, determining whether a bond has been posted includes determining whether a bond payment has been made, and step 1140 is performed as part of step 1150. Alternatively, if the posting of a bond indicates that the bond has been paid, then step 1140 is not performed and the check performed in step 1150 may indicate whether the bond has been paid. If the bond is not posted within a predetermined period of time in step 1150, then the sender is rejected in step 1115 and may be associated with a Pending Bond Post Rejected state.

If the bond is posted in step 1150, then in step 1160 the sender is activated. While the sender is activated, the sender may be associated with an Active state. In one embodiment, activating the sender includes enabling the sender's participation in the techniques facilitating transmission of a message from the sender to a receiver described herein.

In step 1170, a check is performed to determine whether the sender should be disabled automatically. In various embodiments, checking to determine whether a sender should be disabled automatically includes determining whether the sender has exceeded an allowed number of complaints, whether the balance of a bond associated with the sender has dipped below a certain level, whether the sender has been added to one or more blacklists, whether the sender has had more than a predefined number of messages indicated as spam by receivers or by spam filters, or any other appropriate check. If in step 1170, it is determined that the sender should not be automatically disabled, then the sender remains active (step 1160). If the check determines that the sender should be automatically disabled, then the sender is disabled in step 1175. In one embodiment, if the sender is automatically disabled, then the sender is associated with a Disabled Automatically state.

In one embodiment, the sender may be manually disabled in step 1180. In various embodiments, the reasons that a sender may be disabled include a change in the sender privacy policy, the inclusion of the sender in one or more blacklists, the complaint rate of a sender being worse than a predefined threshold, the balance in a bond account for a sender being below a certain predefined threshold, any inappropriate action by the sender that is not automatically detectable in step 1170, or for any other appropriate reason. If the sender is manually disabled in step 1180, then the sender is disabled in step 1175, and the sender may be associated with a Disabled Manually state. If the sender is not disabled manually in step 1180, then the sender remains active (step 1160).

In various embodiments, disabling a sender in step 1175 includes associating with the sender a Disabled Manually or Disabled Automatically state, withdrawing the sender from the programs for facilitating transmission of a message from a sender to a receiver described herein, sending a message to the sender indicating why the sender has been disabled, sending a message to the sender indicating how the sender may be reactivated, or any other appropriate action. In various embodiments, a sender may be reactivated and reactivating a sender includes checking payment authorization (step 1105), determining whether the sender is pre-qualified (step 1110), determining whether the sender is certified, determining whether the sender fulfills the license policy (step 1130), determining whether the sender has paid the bond (step 1140), determining whether the sender has posted a bond (1150), activating the sender (step 1160), or any other appropriate action.

As noted above, in various embodiments, the sender may be associated with one or more states. These states, along with account-related information, may serve as search criteria for administrators, senders, and others requesting information about senders. The states may also act as gating mechanisms ensuring that a sender proceeds in an orderly qualification, certification, and payment process before becoming an active participant in the techniques for facilitating transmission of a message from a sender to a receiver described herein.

4.0 Alerts

In various embodiments, alerts may be triggered at any of the steps 212, 514, 540, 706, 708, 712, 714, 716, 1006, 1008, 1010, 1012, 1014, 1020, 1022, 1024, 1105-1180, or based on any appropriate condition or event. In various embodiments, a "subscriber", e.g. an administrator associated with the sender, may be subscribed to one or more alerts. In various embodiments, subscribers are humans or machines associated with a sender or a message processing system.

In various particular embodiments, a subscriber is given the option of subscribing to an alert when the number of complaints associated with the sender reaches a predefined limit; when the number of complaints per million messages reaches a predefined limit; when a certain number of messages are filtered by spam filters; when the number of messages filtered by spam filters per million messages sent reaches a predefined limit; when the sender or an IP address associated with the sender is added to or removed from a blacklist; when there is a spike in volume of messages sent from the sender; or any other appropriate event. A volume spike may be indicated, for example, when the daily volume for a message sender is 25% above the average daily volume for the sender. A volume spike for a sender may indicate that one or more servers associated with the sender may be being used inappropriately by, e.g., an inappropriate operator sending messages illegally from the one or more servers. For example, in the context of FIG. 1, an administrator associated with an outbound messaging gateway 104 may subscribe to an email alert indicating a volume spike at each IP address associated with the outbound messaging gateway 104.

In various embodiments, a human operator associated with a message sender subscribes to an alert using a graphical user interface. An example graphical user interface for subscribing to alerts is depicted in and described below with respect to FIG. 17. In other embodiments, the human operator may subscribe to alerts by filling in a paper or electronic form indicating to what alters the subscriber would like to subscribe and sending the form to an entity associated with the message processing system, or any other appropriate method.

In one embodiment, a software module running as part of a message processing system performs one or more checks to determine whether a condition has occurred in which an email alert should be sent. If an email alert should be sent, the message processing system sends the email alert to the subscribed entity.

In various embodiments, alerts are generated for each sender, for each IP address associated with a sender, for groups of IP addresses associated with a sender, or for any other grouping. That is, alerts may be generated for any grouping of IP addresses associated with the sender and subscribers may subscribe to alerts for any grouping of IP addresses. In various embodiments, alerts are provided via email, fax, phone, using messaging middleware such as event an bus, via an electronic protocol such as HTTP, secure HTTP (HTTPS), File Transfer Protocol (FTP), SMTP, etc. over any appropriate transmission medium. In various embodiments, alerts may be generated in any appropriate format including human-readable text, Hypertext Markup Language (HTML), Extensible Markup Language (XML), etc.

For example, in the context of FIG. 1 and FIG. 17 (described below), a human operator associated with a sender 102 signs up to receive an email alert whenever the number of complaints associated with the sender 102 exceed one complaint per million messages sent by the sender. The human operator makes this indication by selecting the appropriate option on the alert dashboard page 1700. Whenever the number of complaints associated with the sender exceeds one complaint per million messages sent, then the message processing system 106 sends an email to the human operator indicating the same.

5.0 Example Graphical User Interface

A described above with respect to FIG. 1B, a message processing system 106 or a process communicatively coupled thereto may provide graphical user interface pages to an administrator of a sender 102, a message processing system 106, or an inbound message gateway 110 or any other appropriate user. FIG. 12-FIG. 18 depict example interface pages that may be provided by a message processing system or any other appropriate process. FIG. 12-FIG. 18 depict particular layouts and arrangements of interface elements. The techniques described herein are in no way limited to such layouts and arrangements. The examples of FIG. 12-FIG. 18 are provided for illustrative purposes only.

Each of the pages depicted in FIG. 12-FIG. 18 may be provided for some or all three different example types of accounts: an oversight account, a sender account, and a superuser account. The techniques described herein are in no way limited to these three types of account nor are the techniques required to provide such accounts. The account types discussed herein are for illustrative purposes only. In the example discussed herein, a sender account is provided to a user that is associated with a company that is a bonded sender. In general, users with sender accounts may view information about any company and may alter information about the company with which they are associated. A superuser account is generally for administrators of a message processing system. In general, users with superuser accounts may view and alter information about any company. An oversight account is generally an account for a user that is not associated with a company that is a bonded sender. In general, the oversight account users may view information about any company but may not alter the information. Example pages for each of the account types are depicted below in the sections entitled Sender Interface, Superuser Interface, and Oversight Interface. In other embodiments, each of these pages may be available to other account types, including account types that are not defined or described herein. As an example, in the context of FIG. 1B, the sender pages 120A include the sender interface pages described below; the administrative pages 120B include the superuser interface pages described below; and the receiver pages 120C include the oversight interface pages described below.

The pages illustrated in FIG. 12-FIG. 18 may be in any appropriate underlying format. Example formats include HTML and XML. The particular construction elements used for the elements in each of the pages illustrated in FIG. 12-FIG. 18 may depend on the underlying format used to construct each page. The construction elements used in no way limits the techniques described herein.

In general, selectable construction elements, such as selectable links, entries in selection columns and selection rows, selectable mechanisms, indication mechanisms, and selectable processing mechanisms referenced herein each enable the selection of one or more items in a group. In one embodiment, a selectable construction element comprises one or more HTML or XML-supported radio buttons, allowing the selection of one of a group of option associated with each radio button. In one embodiment, a selectable construction element is a selectable HTML or XML hyperlink. Alternatively, a selectable construction element may be a combination of a text entry field and a button or link. When the button, link, or other selectable mechanism is selected, the entry in the text field is processed. In another embodiment, a selectable construction element is a dropdown list of choices or combo-box. In a related embodiment, when an item or function is selected from among the list of drop down items, the choice is processed using appropriate processing logic to implement the selected item or function. Alternatively, a choice is selected from the drop down list of choices and the choice is processed when a second selectable construction element is selected (e.g. pressing a HTML button).

5.1 Sender Interface

Figure 12:
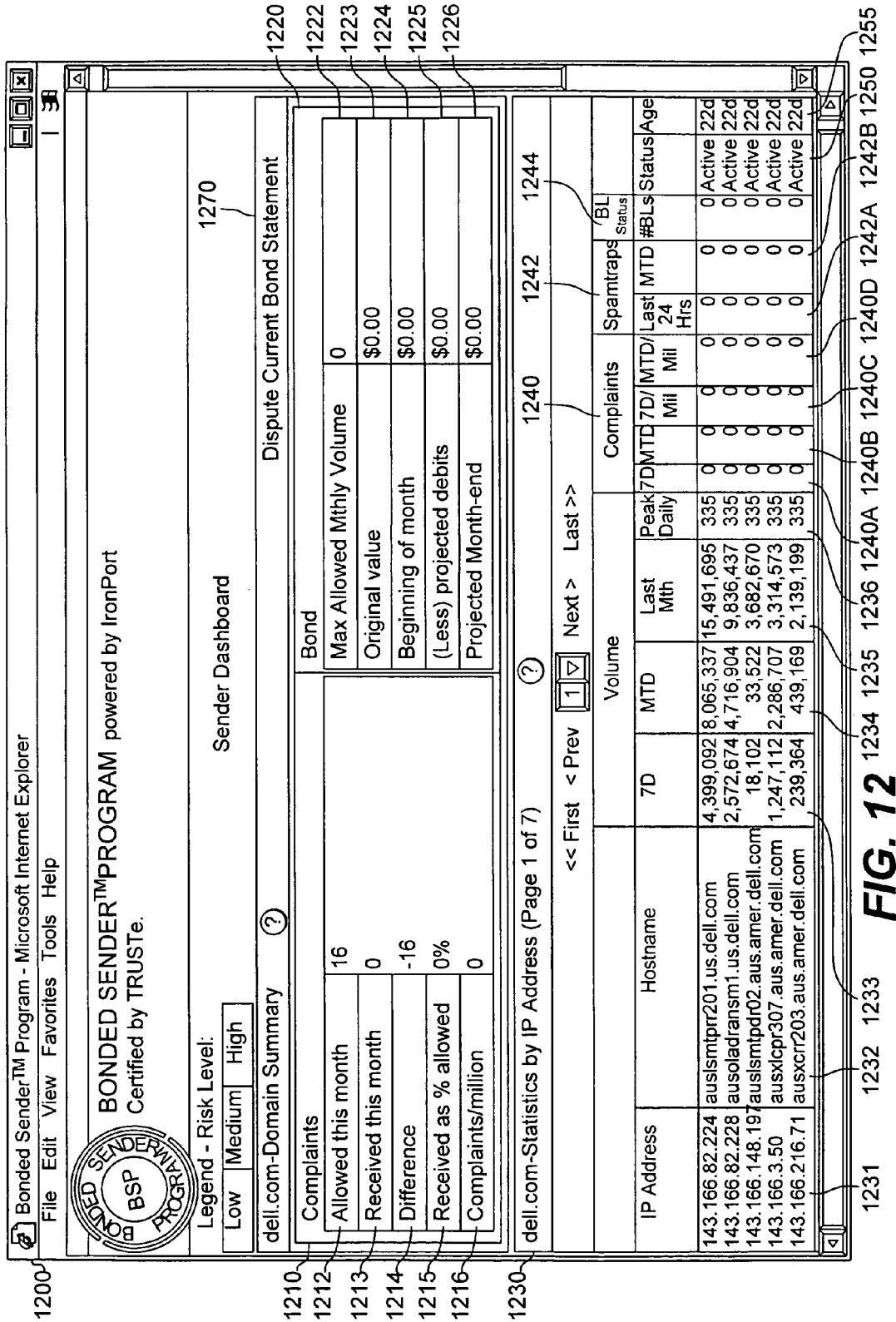
FIG. 12 is an illustration that depicts a sender dashboard page.

FIG. 12 is an illustration that depicts a sender dashboard page 1200. The sender dashboard page 1200 includes a complaints panel 1210, a bond panel 1220, a statistics panel 1230, and a dispute current bond statement link 1270. The information contained on the sender dashboard page 1200 refers to a "sender", and the sender may include one or more senders, IP addresses, group of senders or IP addresses, or any other appropriate grouping. The sender dashboard page 1200 is provided to message senders. For example, in the context of FIG. 1A, a sender dashboard page 1200 is provided to a human operator associated with a sender 102 by a message processing system 106.

The complaints panel 1210 contains information related to the number of complaints associated with the sender made by message receivers. In various embodiments, the complaints panel 1210 includes a number of complaints allowed for a certain period of time for the sender row 1212, number of complaints received during a certain period of time for the sender row 1213, the difference between the number of complaints allowed for the sender and the number of complaints received for the sender during a certain period of time row 1214, the percentage of complaints received for the sender compared to the complaints allowed for the sender during a certain period of time row 1215, or the number of complaints received during a certain period of time as a function of all messages sent by the sender row 1216. The certain period of time may be any appropriate period of time including one week, one month, and one year.

The bond panel 1220 contains information related to the amount of money the sender has provided to a message processing system to use to guarantee messages sent by the sender. In various embodiments, the bond panel 1220 includes an indicator for the maximum allowed volume for the sender 1222 for a particular period of time, an indication of the original value of the bond 1223, an indication of the value of the bond at the beginning of the particular period of time 1224, an indication of outstanding debts for the sender 1225, and a projected value for the bond at the end of the particular period of time 1226. The particular period of time may be any appropriate period of time including one week, one month, and one year. In one embodiment, a level of service for which the sender subscribes determines the maximum number of complaints allowed per month for the sender. For example, a low-message-volume sender may subscribe for a level of service that allows only one million messages per month, and therefore may be allowed only one complaint per month, regardless of how many messages the sender actually sends. The original value of a bond may be the amount of money tendered at the time of bond posting (see FIG. 11, steps 1140 and 1150). The projected debts for a sender may be the sum of one or more amounts of money that have been reserved based on complaints or messages sent by the sender. For example, in the context of FIG. 1A and FIG. 3, if three recipients 112 each complained about the sender 102, and the messages associated with the sender each have a $2.50 bond as associated, then the outstanding debt is $7.50 while those complaints are being verified (step 306) or processed (step 308). The projected month-end balance 1226 of a bond may be the beginning of the month balance 1224 less the outstanding debts 1225.

The statistics panel 1230 includes one or more of an IP address column 1231, a hostname column 1232, a seven-day volume column 1233, a month-to-day volume column 1234, a last month's volume column 1235, a peak daily volume column 1236, a complaints column 1240, a spamtraps column 1242, a blacklists column 1244, a sender status column 1250, and an age column 1255. In general, the entries in each of the columns 1231, 1232, 1233, 1234, 1235, 1236, 1240, 1242, 1244, 1250, and 1255 have corresponding entries so that the "Nth" entry in each column corresponds to the Nth entry in each other column. The entries in the IP address column 1231 indicate an IP address associated with the sender. The entry in the IP address column may also include a selectable link that will cause the display of a page containing information about that IP address. Examples of pages containing information about IP address are given in Flury et al.

The hostname column 1232 indicates the hostname associated with the sender. In one embodiment, the entry in the hostname column 1232 includes a selectable link that will cause the display of a page containing information about that hostname. Examples of hostname pages are given in Flury et al.

The seven-day volume column 1233, month-to-day volume column 1234, and last-month volume column 1235 have entries that indicate the number of messages that have been sent during the given period of time from the IP address indicated in column 1231. In one embodiment, the number of messages sent during the given time period by the IP address is estimated as the number of messages processed by one or more interconnected message processing systems. In another embodiment, the number of message sent during a given time period by the IP address is estimated as the number of messages for which information has been requested by the message sender (as described in Flury et al.). In a related embodiment, the number of messages sent during a given time period for a particular sender is multiplied by a correction factor in order to estimate how many messages have been sent by the sender over the entire Internet. In a related embodiment, the correction factor is equal to an estimate of the number of messages sent over the Internet divided by the number of messages sent using the message processing system.

The peak daily volume column 1236 indicates the maximum number of messages sent during a single day by the IP address indicated in the IP address column 1231. The complaints column 1240 may include a seven-day complaints column 1240A and a month-to-date complaints column 1240B that indicate the number of complaints received during the specified period of time. The complaints column 1240 also contains seven-day complaints per million column 1240C and month-to-day complaints per million column 1240D that indicate the number of complaints received about the IP address in the IP address column 1231 per million messages sent by the IP address.

The spamtraps column 1242 includes a last-24-hours spamtraps column 1242A and a month-to-day spamtraps column 1242B that indicate the number of messages that have been flagged as spam during the specified time period. In various embodiments, the number of messages flagged as spam includes the number indicated as spam by an automatic process on the message processing gateway, at the receiver, at the inbound messaging gateway, or at the recipient.

The blacklists column 1244 contains indication for each IP address in the IP address column 1231 of how many blacklists contain the IP address. The determination of which blacklists contain the IP address may be made by an external service, such as the one described in Flury et al. Alternatively, the message processing system may perform one or more checks on one or more blacklists in order to determine whether the IP address is indicated in one or more blacklists.

The status column 1250 indicates the status of the IP address indicated in the IP address column 1231, and the age column 1255 indicates how long the IP address in the IP address column 1231 has been associated with the status indicated in the status column 1250.

The dispute current bond statement link 1270, when selected may cause the generation of a dispute entry page that enables the dispute of the current bond statement or a second page that describes the dispute procedure. The dispute entry page may provide an administrator or accounting representative associated with a sender the ability to dispute one or more deposits made to an account associated with the sender, dispute one or more complaints made against the sender, or dispute one or more debits made from an account associated with the sender. The page may be in any appropriate format and may provide any appropriate fields.

The sender dashboard page 1200 may also provide an account profile link, that, when selected, causes the generation of a page that enables an administrator associated with the sender to change account information associated with the sender. The account information that may be provided for updating and editing may include, but is not limited to contact name, email, address, fax number, and phone number, company name, company domain, IP addresses associated with the company, password, alert preferences, or any other account information.

5.2 Superuser Interface

Figure 13:
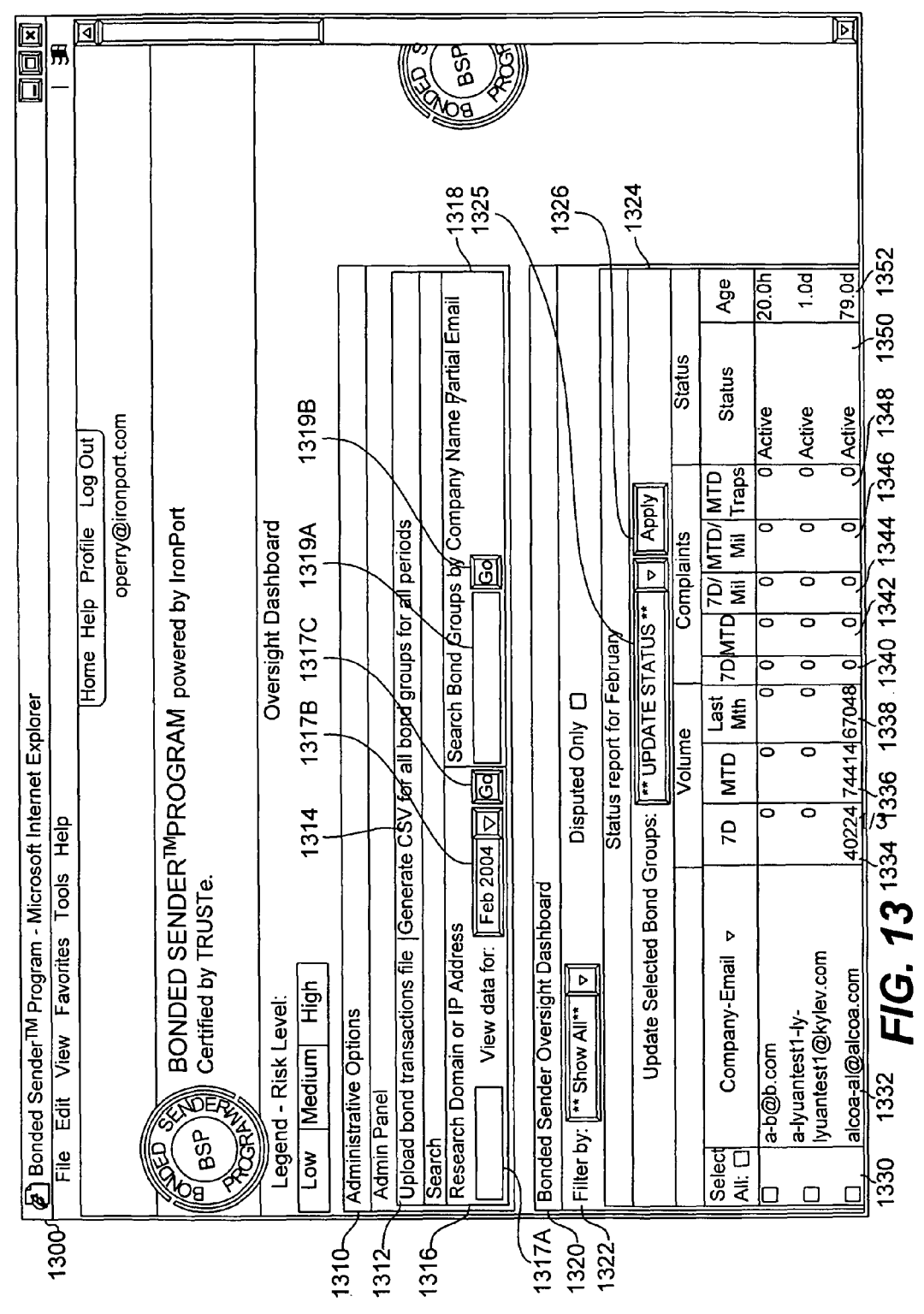

FIG. 13 is an illustration that depicts an oversight dashboard page 1300. The oversight dashboard page 1300 may be provided to an administrator of a message processing system or other user that has a superuser account. For example, in the context of FIG. 1B, an oversight dashboard page 1300 is provided to an administrator for a message processing system 106 via a web server 122.

The oversight dashboard page 1300 includes an administrative panel 1310 and a company statistics panel 1320. In various embodiments, the administrative panel 1310 includes one or more of the following: a selectable upload bond transaction link 1312, a selectable generate history link 1314, a research domain or IP address panel 1316, and a search for bond group panel 1318. A selectable upload bond transaction link 1312, when selected, causes the generation of a page that may be used to upload bond transactions. In various embodiments, the bond transactions may be typed or pasted into a text field on a HTML or XML page in comma-separate, HTML, XML or any other appropriate format. In another embodiment, the bond transactions are provided as part of a file, the path to which is indicated on the page for uploading bond transactions.

The selectable generate history link 1314, when selected may cause a page or file to be generated, the page or file containing one or more historical transactions related to the bonds of the one or more companies indicated in the company statistics panel 1320.

The research domain or IP address panel 1316 provides a field for entry of an IP address or domain name 1317A, a time period entry field 1317B, and a selectable processing mechanism 1317C. Upon selecting the selection mechanism 1317C, a research page 1400 (described below) is generated for the domain or IP address indicated in the IP address or domain name field 1317A for the time period indicated in the time period entry field 1317B.

The search for bond group panel 1318 includes a company name or email text entry field 1319A and a selectable processing mechanism 1319B. Part of a company name or email may be entered in the company name or email text entry field 1319A. When the selectable processing mechanism 1319B is selected, a search is performed for any senders having company information or email information matching the entry in the company name or email text entry field 1319A and a search results page 1500 is produced (see FIG. 15).

The company statistics panel 1320 includes a filter by status indicator 1322, a status update panel 1324, a selection column 1330, a company information column 1332, a seven-day volume column 1334, a month-to-day volume column 1336, a last-month volume column 1338, a seven-day complaints column 1340, a month-to-day complaints column 1342, a seven-day complaints per million column 1344, a month-to-day complaints per million column 1346, a month-to-day spamtraps column 1348, a status column 1350, and an age column 1352. Columns 1334, 1335, 1338, 1340, 1342, 1344, 1346, 1348, 1350, and 1352 are described above with respect to columns 1233, 1234, 1235, 1240A, 1240B, 1240C, 1240D, 1242B, 1250, and 1255, respectively. The information for each entry in columns 1334, 1335, 1338, 1340, 1342, 1344, 1346, 1348, 1350, and 1352 corresponds to the company indicated in the corresponding entry in the company information column 1332.

The filter by status indicator 1322 is a selection mechanism that enables the user to choose to display in the company statistics panel 1320 only those companies that have a certain status. In one embodiment, the filter by status indicator 1322 is a drop down list of statuses. If all statuses are selected, all companies are shown in the company statistics panel 1320. If a particular status is selected, then only those companies who are in that particular status are shown in the company statistics panel 1320. Various example statuses are described above in the section entitled Activating and Deactivating Senders.

The selection column 1330 has a selection mechanism corresponding to each company in the company or company information column 1332. Zero or more of the selection mechanisms in the selection column 1330 may be selected at any one time. The status update panel 1324 provides a status selection mechanism 1325 and a selectable processing mechanism 1326. The status selection mechanism 1325 may be used to indicate a status to apply to the companies that are indicated in the selection column 1330. When the selectable processing mechanism 1326 is selected, the status indicated in the status selection mechanism 1325 is applied to the companies that are indicated in the selection column 1330.

Figure 14:
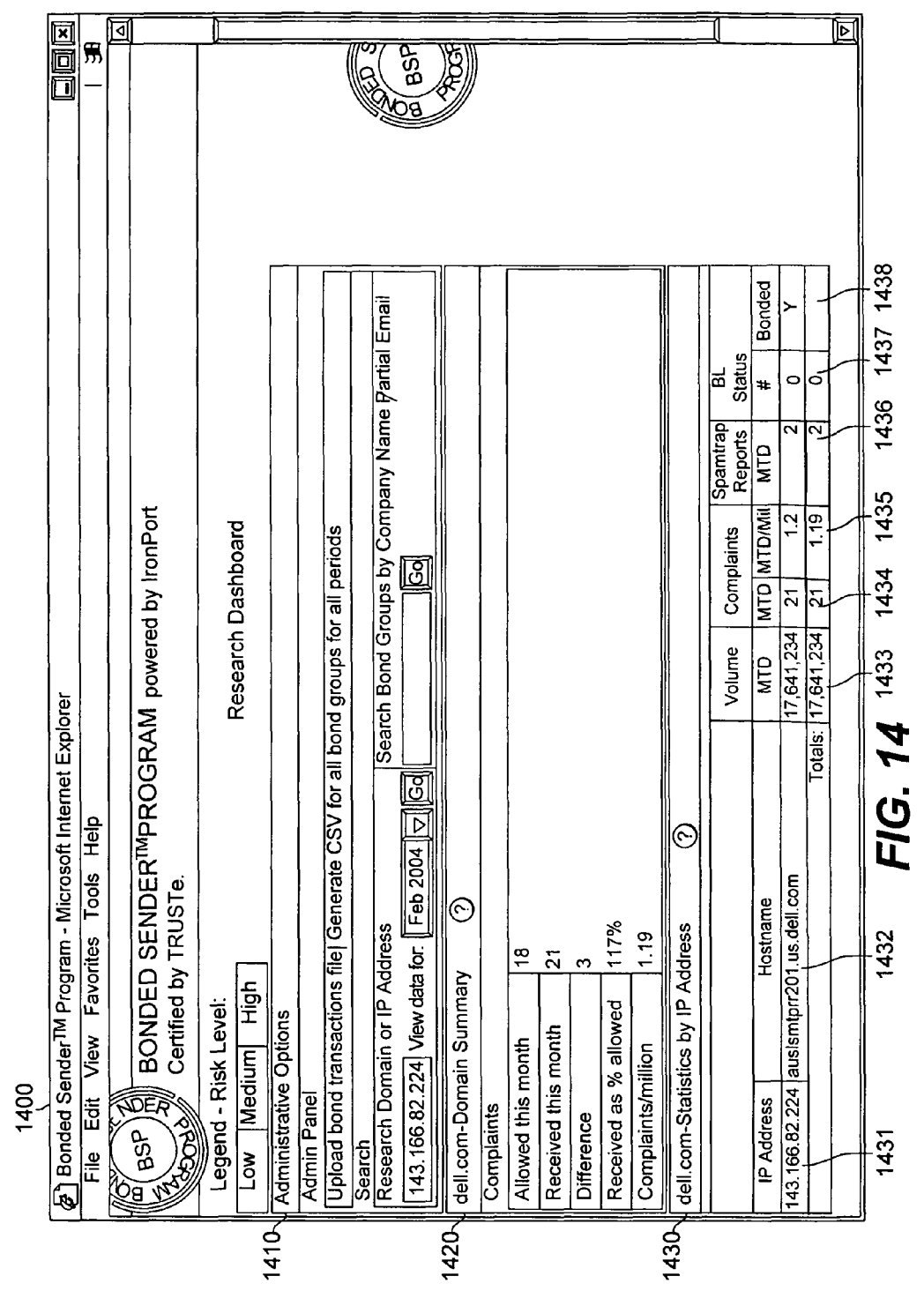

FIG. 14 is an illustration that depicts a research page 1400. The research page 1400 provides information about a particular IP address or domain name.

The research page 1400 includes an administrative panel 1410, a complaints panel 1420, and a statistics by IP address panel 1430. The administrative panel 1410 and complaints panel 1420 are described above with respect to administrative panel 1310 and complaints panel 1210.

The statistics by IP address panel 1430 includes an IP address column 1431, a hostname column 1432, a month-to-day volume column 1433, a month-to-day complaints column 1434, a month-to-day complaints per million column 1435, a month-to-day spamtraps column 1436, a blacklists column 1437, and a bonded indicator column 1438. Columns 1431, 1432, 1433, 1434, 1435, 1436, and 1437 are described above with respect to columns 1231, 1232, 1234, 1240D, 1242B, and 1244, respectively. The bonded indicator column contains a textual, graphic, color, or other indicator that indicates whether the IP address indicated in the IP address column 1431 is involved in a service providing the techniques described herein for facilitating transmission of a message from a sender to a receiver.

Figure 15:
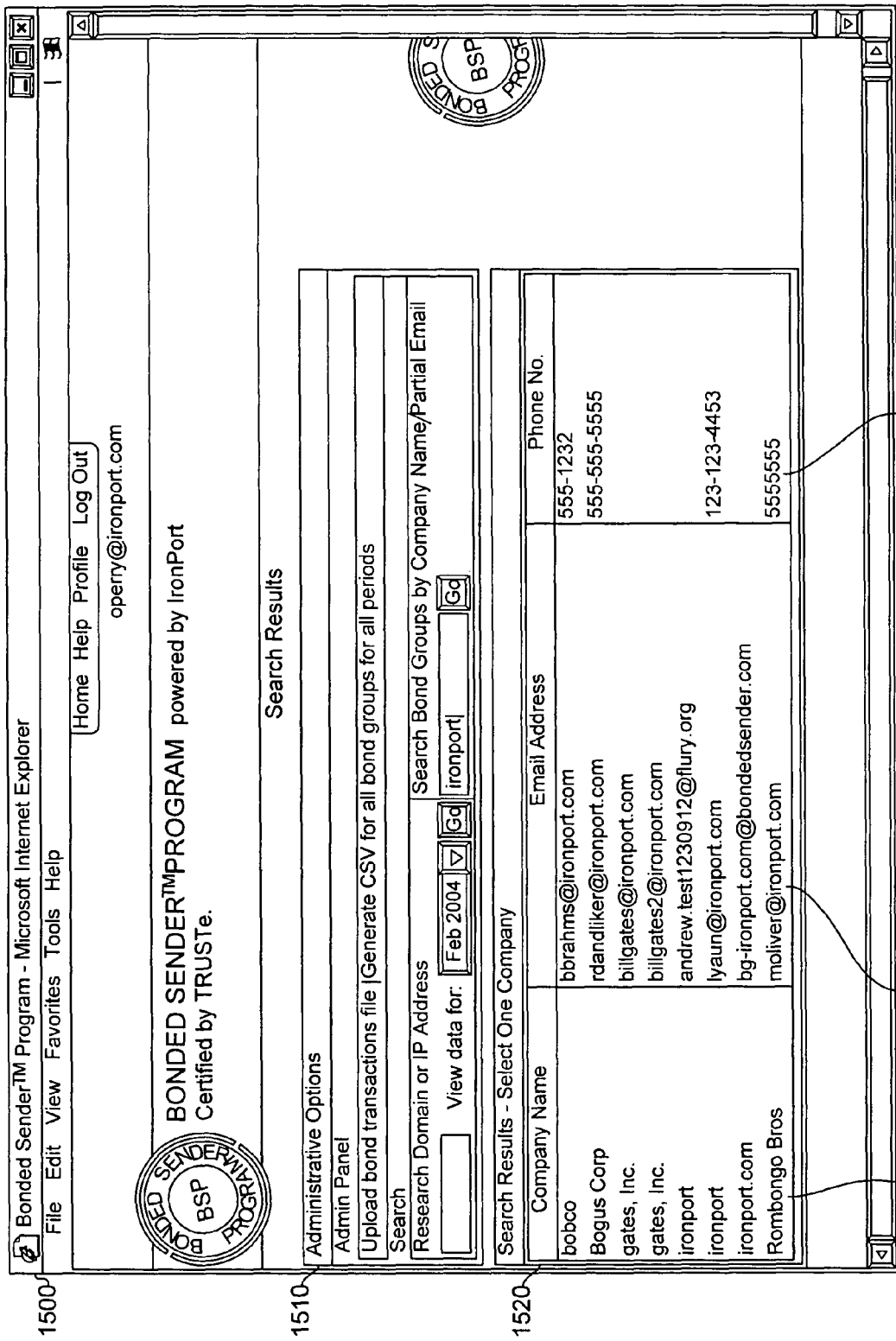
FIG. 15 is an illustration that depicts a search results page.

FIG. 15 is an illustration that depicts a search results page 1500. The search results page may be generated, for example, by performing a search using the search for bond group panel 1318 of FIG. 13.

The search results page 1500 includes an administrative panel 1510 and a search results panel 1520. The administrative panel 1510 is described above with respect to administrative panel 1310. The search results panel includes a company name column 1522 an email address column 1524 and a phone number column 1526. Each entry in the company name column 1522 includes a text string identifying a particular company. Each entry in the company name column 1522 may also include a selectable link, such as an XML or HTML link, that, when selected, causes a company administration page 1600 to be generated (see FIG. 16A and FIG. 16B). The email address column 1524 and phone number column 1526 contain entries for contact email addresses and contact phone numbers for the corresponding entries in the company name column 1522.

Figure 16A:
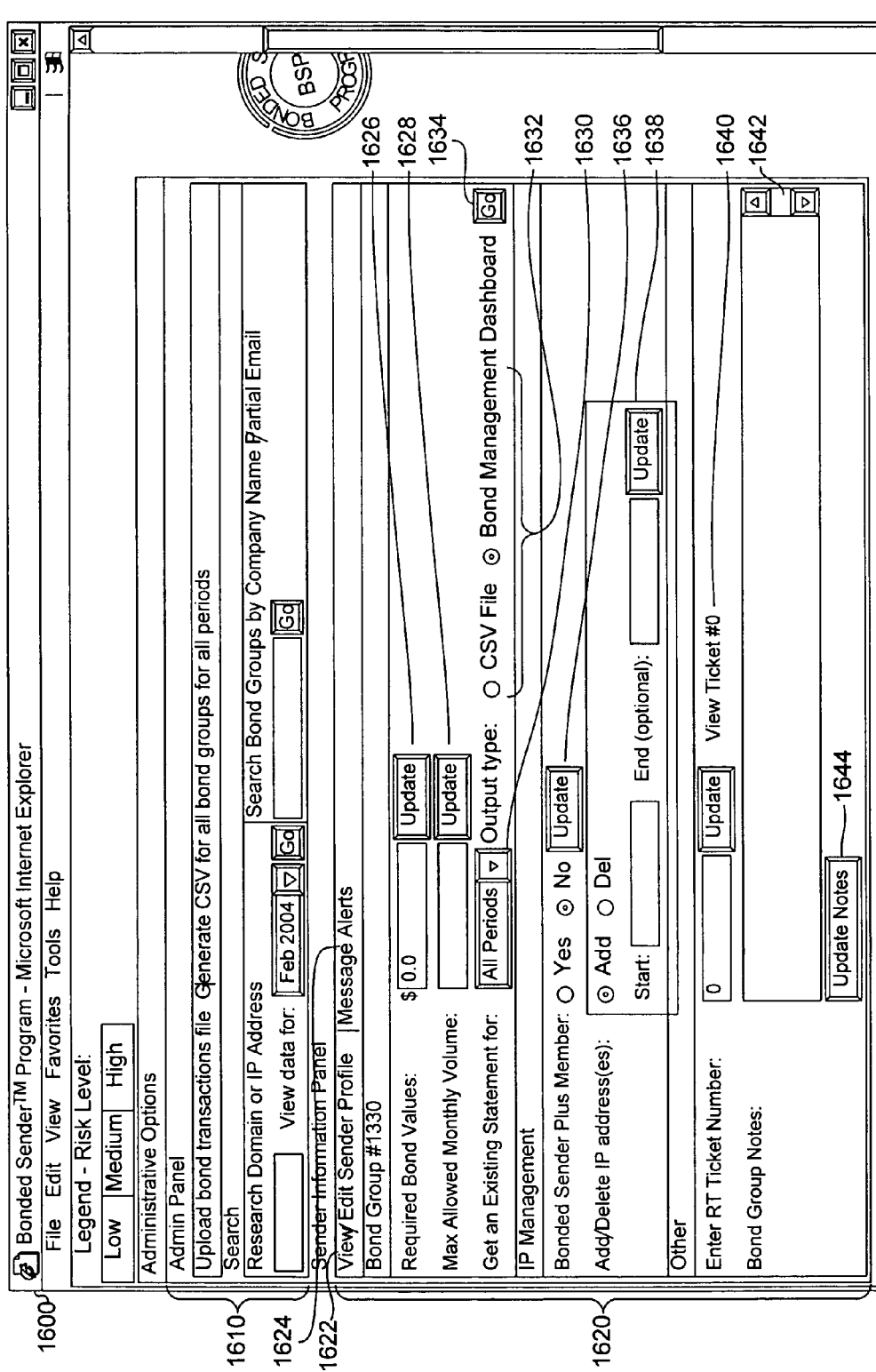
Figure 16B:
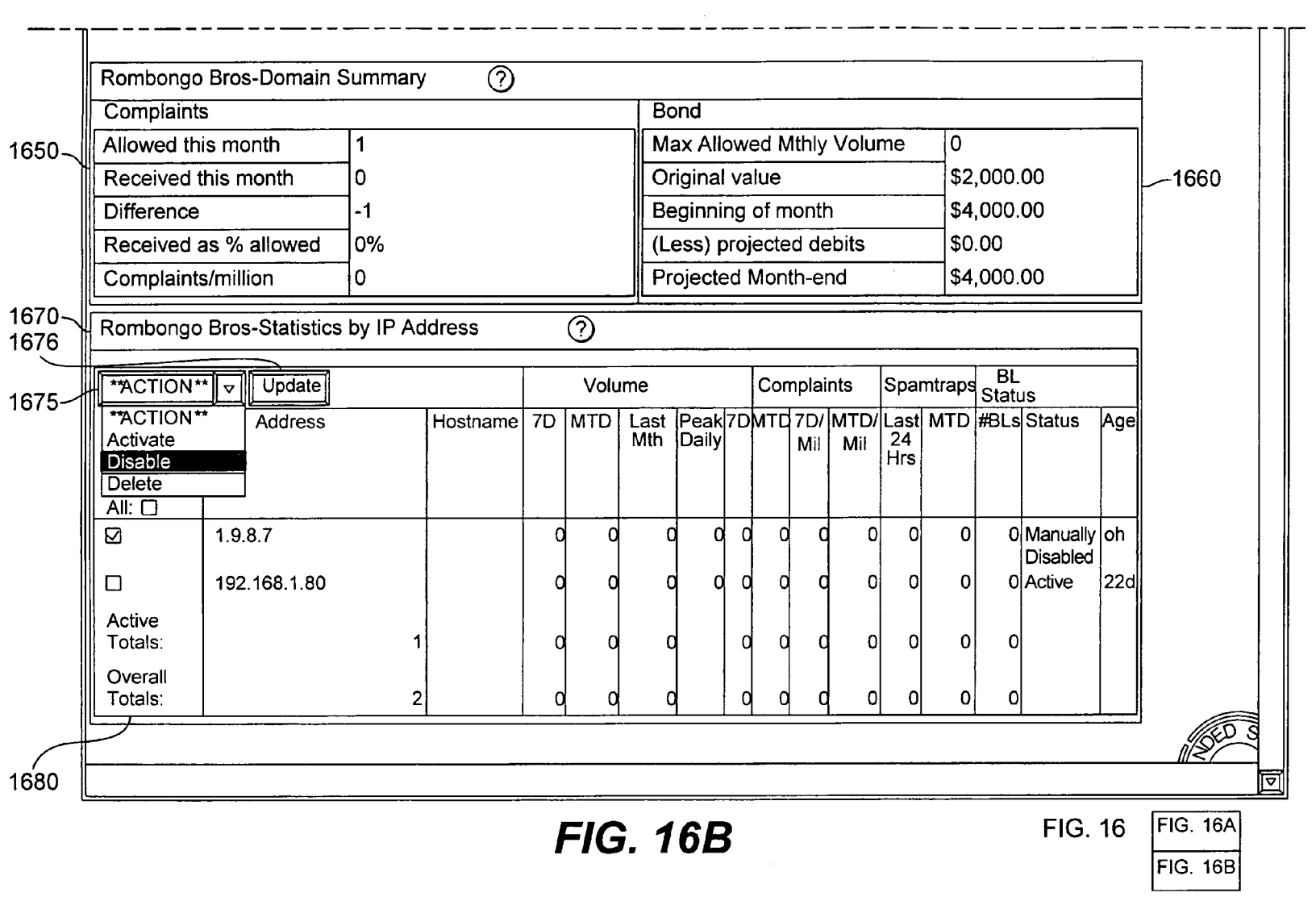

FIG. 16A and FIG. 16B together form an illustration that depicts a company administration page 1600. The company administration page may be generated, for example, by selecting the selectable link for a company in the company name column 1522 of the search results page 1500.

The company administration page 1600 includes an administrative panel 1610, a sender information panel 1620, a complaints panel 1650, a bond panel 1660, and a company information by IP address panel 1670. The panels 1610, 1650, and 1660 are described above with respect to panels 1310, 1210, and 1220, respectively.

The sender information panel 1620 includes a view/edit sender profile link 1622, a manage alerts link 1624, a required bond value indication mechanism 1626, a maximum allowed monthly volume indication mechanism 1628, a time period selection mechanism 1630, an output type selection mechanism 1632, a selectable processing mechanism 1634, a membership selection mechanism 1636, an IP address addition and deletion mechanism 1638, a ticket number selection mechanism 1640, a text display and entry field 1642, and a selectable processing mechanism 1644. The view/edit sender profile link 1622 is a selectable link that, when selected, causes a page to be displayed that enables the viewing and editing of profile information for the company associated with the company administration page 1600. The manage alerts link 1624 when selected, causes an alert dashboard page 1700 to be generated. The required bond value indication mechanism 1626 enables the required bond value for the company to be updated. In the example shown, a text field is provided for entry of a required bond value and a selection mechanism is used to indicate that the value should be assigned to the required bond for the company.

The maximum allowed monthly volume indication mechanism 1628 enables the maximum allowed monthly volume for the company to be updated. In the example shown, a text field is provided for entry of a volume number and a selection mechanism is used to indicate that the value should be assigned to the maximum allowed monthly volume of messages sent for the company.

The time period selection mechanism 1630, the output type selection mechanism 1632, and the selectable processing mechanism 1634 are used to retrieve a statement of credits and debits to an account associated with the company for a particular time period. When the selectable processing mechanism 1634 is selected, a statement for the company is generated for the time period indicated in the time period selection mechanism 1630 in the format indicated in the output type selection mechanism 1632.

The membership selection mechanism 1636 enables updating of the membership status of the company. In the example shown, two membership options are shown, and a human operator may select one of the two membership options. The IP address addition and deletion mechanism 1638 enables a human operator to associate or dissociate IP addresses or ranges of IP addresses with the company. In the example shown, the IP addresses may be typed in text fields and association or dissociation of those IP addresses indicated. In other examples, IP addresses already associated with the company may be shown and selection among those IP addresses for dissociation indicated using a selection mechanism.

The ticket number selection mechanism 1640 enables entry of a ticket number. When a ticket number is selected using the ticket number selection mechanism 1640, text information associated with the ticket number is displayed in the text display and entry field 1642. A human operator may modify text in the text display and entry field 1642. When the selectable processing mechanism 1644 is selected, the ticket selected using the ticket number selection mechanism 1640 is associated with text in the text display and entry field 1642. For example, in the context of FIG. 1B, a database 124 contains one or more tickets, each associated with a ticket number. The tickets represent administrative, accounting, or other information about a company. The ticket number selection mechanism 1640 is used to retrieve the text information associated with a particular ticket. The text associated with the particular ticket is displayed in and later updated the text display and entry field 1642. Once the selectable processing mechanism 1644 is selected, the message processing system 106 replaces the text associated with the particular ticket in the database 124 with the text in the text display and entry field 1642.

The company information by IP address panel 1670 has all of the components of statistics panel 1230, and in addition contains a status selection mechanism 1675, a selectable processing mechanism 1676, and a selection column 1680, which are described above with respect to the status selection mechanism 1325, the selectable processing mechanism 1326, and the selection column 1330, respectively. In general, the company information by IP address panel 1670 provides information for each IP address associated with a company. The selection column 1680 provides selection means for each IP address associated with the company. If one or more of the IP addresses are selected, then a new status may be selected with the status selection mechanism 1675. If the selectable processing mechanism 1676 is selected, the status selected with the status selection mechanism 1675 will be applied to each IP address indicated in the selection column 1680.

Figure 17:
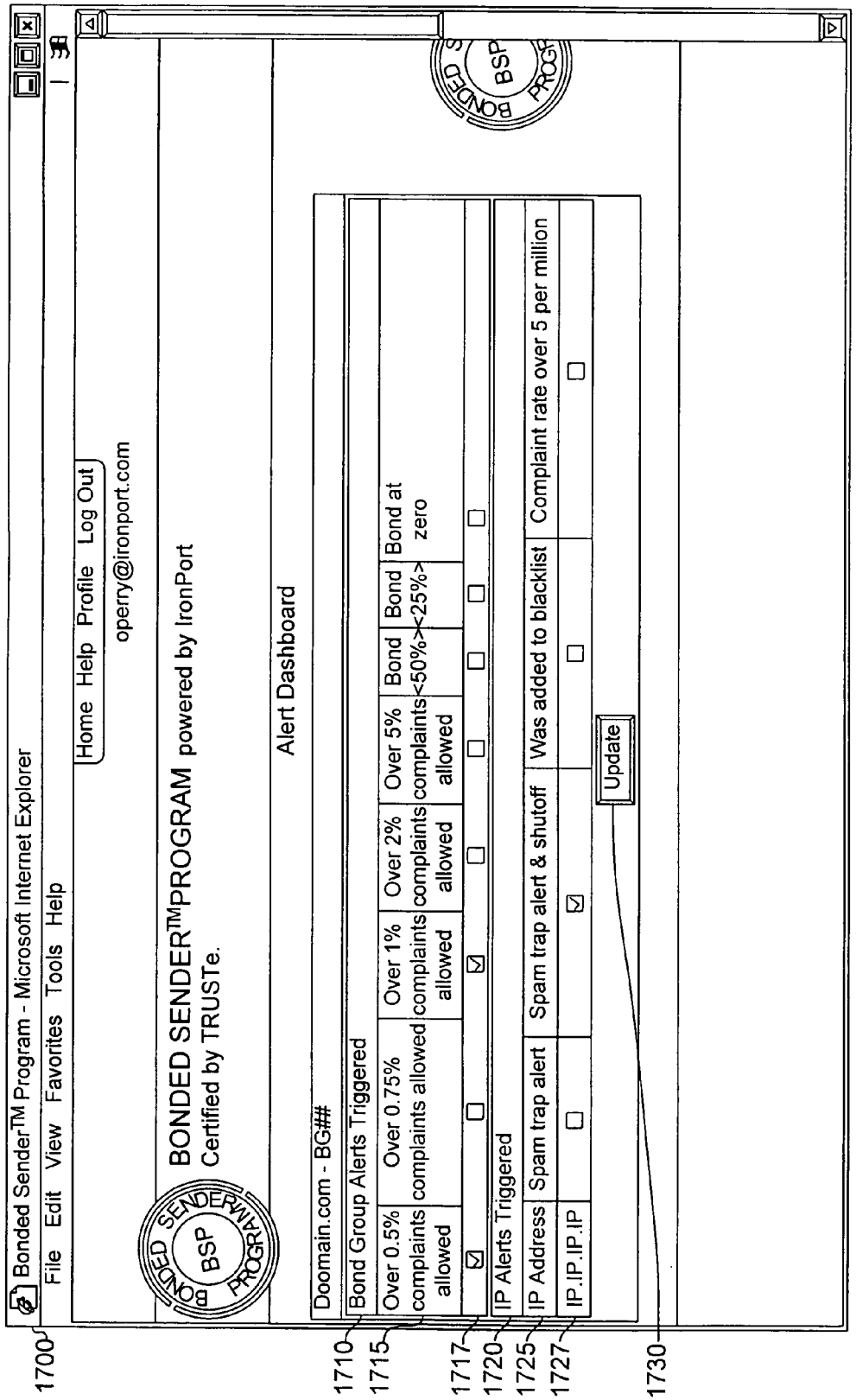
FIG. 17 is an illustration that depicts an alerts dashboard.

FIG. 17 is an illustration that depicts an alert dashboard page 1700. The alerts dashboard may be generated by the selection of manage alerts link 1624. The alerts dashboard provides one mechanism by which an administrator for a company may indicate which alerts the administrator or user would like to receive. Alerts are described above in the section entitled Alert Messages.

The alert dashboard page 1700 includes a bond group alerts panel 1710, an IP alerts panel 1720, and a selectable processing mechanism 1730. The bond group alerts panel 1710 includes a group alert identifier row 1715 and a group alert selection row 1717. Each entry in the group alert identifier row 1715 has a corresponding entry in the group alert selection row 1717. Similarly, the IP alerts panel 1720 includes an IP alert identifier row 1725 and an IP alert selection row 1727. Each entry in the IP alert identifier row 1725 has a corresponding entry in the IP alert selection row 1727. The IP alert selection row may include multiple rows, each for a different IP address associated with the group.

When the selectable processing mechanism 1730 is selected, then one or more representatives of the company associated with the alert dashboard page 1700 or one or more other users may be subscribed to the one or more alerts that are selected in the group alert selection row 1717 and the IP alert selection row 1727. For example, in the context of FIG. 1B, when the selectable processing mechanism 1730 is selected, then the message processing server 106 stores an indication in the database 124 that the one or more representatives of the company associated with the alert dashboard page 1700 will receive alerts to the one or more alerts that are selected in the group alert selection row 1717 and the IP alert selection row 1727.

5.3 Oversight Interface

Figure 18:
FIG. 18 is an illustration depicting an oversight account page.

FIG. 18 is an illustration depicting an oversight account page 1800. The oversight account page may be generated, for example, when a user having an oversight account logs into her account.

The oversight account page 1800 includes an administrative panel 1810 and a bonded sender oversight panel 1820. The administrative panel 1810 is described above with respect to the administrative panel 1310. The bonded sender oversight panel 1820 has all of the elements of the company statistics panel 1320 except the status selection mechanism 1325, the selectable processing mechanism 1326, and the selection column 1330. Therefore, the bonded sender oversight panel 1820 enables the viewing of companies and their volume, complaint, and status information. The bonded sender oversight panel 1820 also enables filtering of companies by status, but, unlike the administrative panel 1310, does not enable the updating of statuses for companies.

The user interface pages described herein provide a novel and intuitive interface for viewing and managing information related to the techniques described herein.

6.0 Implementation Mechanisms—Hardware Overview

Figure 9:
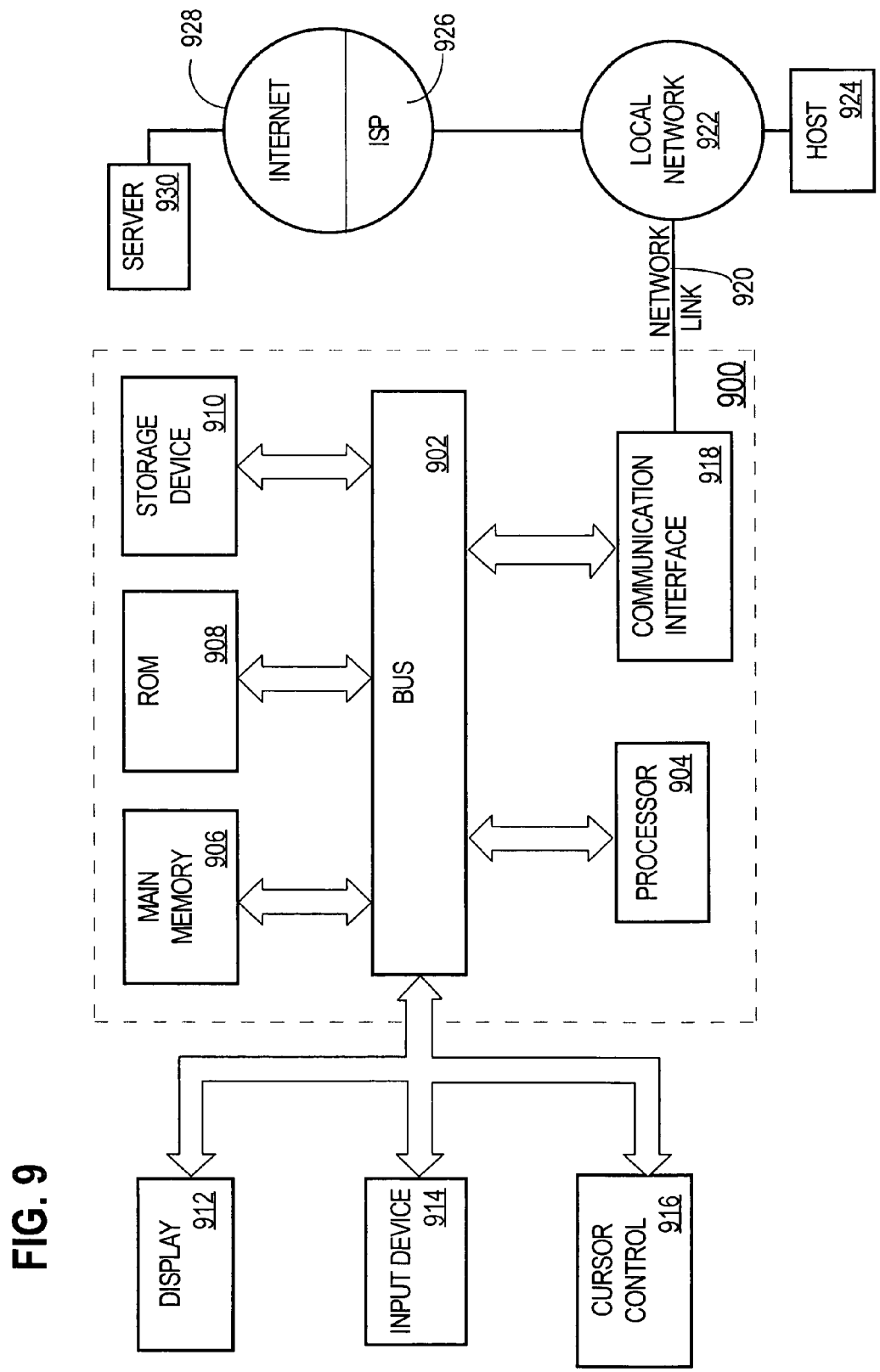
FIG. 9 is a block diagram that illustrates a computer system upon which an embodiment may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory ("RAM") or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube ("CRT"), for displaying information to a computer user. An input device 914, including alphanumeric and other keys, is coupled to bus 902 for communicating information and command selections to processor 904. Another type of user input device is cursor control 916, such as a mouse, trackball, stylus, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for electronic message delivery approaches. According to one embodiment of the invention, electronic message delivery approaches are provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network ("ISDN") card or a modem to provide a data communication connection to a corresponding type of telephone line. As another example, communication interface 918 may be a local area network ("LAN") card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for electronic message delivery approaches as described herein.

The received code may be executed by processor 904 as it is received, and/or stored in storage device 910, or other non-volatile storage for later execution. In this manner, computer system 900 may obtain application code in the form of a carrier wave.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of facilitating transmission of a message from a sender to a receiver, comprising:
   receiving a query about whether the sender of the message satisfies specified sending criteria;
   creating and storing information relating to whether the sender satisfies the specified sending criteria;
   providing a complaints panel as part of a graphical user interface that reports the information;
   providing a bond panel as part of the graphical user interface; and
   providing a statistics by IP address panel as part of the graphical user interface;
   wherein providing the complaints panel comprises:
   providing a number of complaints allowed for a certain period of time for the sender indicator;
   providing a number of complaints received during the certain period of time for the sender indicator;
   providing a difference between the number of complaints allowed for the sender and the number of complaints received for the sender during the certain period of time indicator;
   providing a percentage of complaints received for the sender as compared to the complaints allowed for the sender during the certain period of time indicator; and providing the number of complaints received for the sender during the certain period of time as a function of all messages sent by the sender indicator.

2. A method of facilitating transmission of a message from a sender to a receiver, comprising:
receiving a query about whether the sender of the message satisfies specified sending criteria;
creating and storing information relating to whether the sender satisfies the specified sending criteria;
providing a complaints panel as part of a graphical user interface that reports the information;
providing a bond panel as part of the graphical user interface; and
providing a statistics by IP address panel as part of the graphical user interface;
wherein providing the bond panel comprises:
providing a maximum allowed volume for the sender for a particular period of time indicator;
providing an original value of the bond indicator;
providing a value of the bond at the beginning of the particular period of time indicator;
providing an outstanding debts for the sender indicator; and
providing a projected value for the bond at the end of the particular period of time indicator.

3. A method of facilitating transmission of a message from a sender to a receiver, comprising:
receiving a query about whether the sender of the message satisfies specified sending criteria;
creating and storing information relating to whether the sender satisfies the specified sending criteria;
providing a complaints panel as part of a graphical user interface that reports the information;
providing a bond panel as part of the graphical user interface; and
providing a statistics by IP address panel as part of the graphical user interface;
wherein providing the statistics by IP address panel comprises:
providing an IP address indicator;
providing a hostname indicator;
providing a seven-day volume indicator;
providing a month-to-day volume indicator;
providing a last month's volume indicator;
providing a peak daily volume indicator;
providing a complaints indicator;
providing a spamtraps indicator;
providing a blacklists indicator;
providing a sender status indicator; and
providing an age of status indicator.

4. The method of claim 3, wherein providing the complaints indicator comprises:
providing a seven-day complaints indicator;
providing a month-to-date complaints indicator;
providing a seven-day complaints per millions messages sent indicator; and
providing a month-to-date complaints per millions messages sent indicator.

5. The method of claim 3, wherein providing the spamtraps indicator comprises
providing a last-25-hours spamtraps indicator; and
providing a month-to-day spamtraps indicator.

6. A method of facilitating transmission of a message from a sender to a receiver, comprising:
receiving a query about whether the sender of the message satisfies specified sending criteria;
creating and storing information relating to whether the sender satisfies the specified sending criteria;
providing an administrative panel as part of a graphical user interface that displays the information; and
providing a company statistics panel as part of the graphical user interface;
wherein providing the administrative panel comprises;
providing a selectable upload bond transaction link,
providing a selectable generate history link;
providing a research domain or IP address panel; and
providing a search for bond group panel.

7. The method of claim 6, wherein providing the research domain or IP address panel comprises:
providing an IP address or domain name entry field;
providing a time period entry field; and
providing a selectable processing mechanism.

8. The method of claim 6, wherein providing the search for bond group panel comprises:
providing a company name or email text entry field; and
providing a selectable processing mechanism.

9. A method of facilitating transmission of a message from a sender to a receiver, comprising:
receiving a query about whether the sender of the message satisfies specified sending criteria;
creating and storing information relating to whether the sender satisfies the specified sending criteria;
providing an administrative panel as part of a graphical user interface that displays the information; and
providing a company statistics panel as part of the graphical user interface;
wherein providing the company statistics panel comprises:
providing a filter by status indicator;
providing a status selection mechanism;
providing a selectable processing mechanism;
providing a selection indicator;
providing a company information indicator;
providing a seven-day volume column;
providing a month-to-day volume indicator;
providing a last-month volume indicator;
providing a seven-day complaints indicator;
providing a month-to-day complaints indicator;
providing a seven-day complaints per million messages sent indicator;
providing a month-to-day complaints per million messages sent indicator;
providing a month-to-day spamtraps indicator;
providing a status indicator; and
providing an age of status indicator.

10. A method of facilitating transmission of a message from a sender to a receiver, comprising:
receiving a query about whether the sender of the message satisfies specified sending criteria;
creating and storing information relating to whether the sender satisfies the specified sending criteria;
providing an administrative panel as part of a graphical user interface that displays the information;
providing a complaints panel as part of the graphical user interface; and
providing a statistics by IP address panel as part of the graphical user interface;
wherein providing the administrative panel comprises:
providing a selectable upload bond transaction link,
providing a selectable generate history link;
providing a research domain or IP address panel; and
providing a search for bond group panel.

11. A method of facilitating transmission of a message from a sender to a receiver, comprising:

receiving a query about whether the sender of the message satisfies specified sending criteria;
creating and storing information relating to whether the sender satisfies the specified sending criteria;
providing an administrative panel as part of a graphical user interface that displays the information;
providing a complaints panel as part of the graphical user interface; and
providing a statistics by IP address panel as part of the graphical user interface;
wherein providing the complaints panel comprises:
providing a certain period of time for the sender indicator;
providing a number of complaints received during the certain period of time for the sender indicator;
providing a difference between a number of complaints allowed for the sender and the number of complaints received for the sender during the certain period of time indicator;
providing a percentage of complaints received for the sender as compared to the complaints allowed for the sender during the certain period of time indicator; and
providing a number of complaints received for the sender during the certain period of time as a function of all messages sent by the sender indicator.

12. A method of facilitating transmission of a message from a sender to a receiver, comprising:
receiving a query about whether the sender of the message satisfies specified sending criteria;
creating and storing information relating to whether the sender satisfies the specified sending criteria;
providing an administrative panel as part of a graphical user interface that displays the information;
providing a complaints panel as part of the graphical user interface; and
providing a statistics by IP address panel as part of the graphical user interface;
wherein providing the statistics by IP address panel comprises:
providing an IP address indicator;
providing a hostname indicator;
providing a month-to-day volume indicator;
providing a month-to-day complaints indicator;
providing a month-to-day complaints per million messages sent indicator;
providing a month-to-day spamtraps indicator;
providing a blacklists indicator; and
providing a bonded indicator.

13. A method of facilitating transmission of a message from a sender to a receiver, comprising:
receiving a query about whether the sender of the message satisfies specified sending criteria;
creating and storing information relating to whether the sender satisfies the specified sending criteria;
providing a complaints panel as part of a graphical user interface that reports the information;
providing a bond panel as part of the graphical user interface;
providing a statistics by IP address panel as part of the graphical user interface;
providing an administrative panel as part of the graphical user interface; and
providing a sender information panel as part of the graphical user interface;
wherein providing the administrative panel comprises:
providing a selectable upload bond transaction link,
providing a selectable generate history link;
providing a research domain or IP address panel; and
providing a search for bond group panel.

14. A method of facilitating transmission of a message from a sender to a receiver, comprising:
receiving a query about whether the sender of the message satisfies specified sending criteria;
creating and storing information relating to whether the sender satisfies the specified sending criteria;
providing a complaints panel as part of a graphical user interface that reports the information;
providing a bond panel as part of the graphical user interface;
providing a statistics by IP address panel as part of the graphical user interface;
providing an administrative panel as part of the graphical user interface; and
providing a sender information panel as part of the graphical user interface;
wherein providing the bond panel comprises:
providing a maximum allowed volume for the sender for a particular period of time indicator;
providing an original value of the bond indicator;
providing a value of the bond at the beginning of the particular period of time indicator providing an outstanding debts for the sender indicator; and
providing a projected value for the bond at the end of the particular period of time indicator.

15. A method of facilitating transmission of a message from a sender to a receiver, comprising:
receiving a query about whether the sender of the message satisfies specified sending criteria;
creating and storing information relating to whether the sender satisfies the specified sending criteria;
providing a complaints panel as part of a graphical user interface that reports the information;
providing a bond panel as part of the graphical user interface;
providing a statistics by IP address panel as part of the graphical user interface;
providing an administrative panel as part of the graphical user interface; and
providing a sender information panel as part of the graphical user interface;
wherein providing the complaints panel comprises:
providing a number of complaints allowed for a certain period of time for the sender indicator;
providing a number of complaints received during the certain period of time for the sender indicator;
providing a difference between the number of complaints allowed for the sender and the number of complaints received for the sender during the certain period of time indicator;
providing a percentage of complaints received for the sender as compared to the complaints allowed for the sender during the certain period of time indicator; and
providing a number of complaints received for the sender during the certain period of time as a function of all messages sent by the sender indicator.

16. A method of facilitating transmission of a message from a sender to a receiver, comprising:
receiving a query about whether the sender of the message satisfies specified sending criteria;
creating and storing information relating to whether the sender satisfies the specified sending criteria;
providing a complaints panel as part of a graphical user interface that reports the information;

providing a bond panel as part of the graphical user interface;
providing a statistics by IP address panel as part of the graphical user interface;
providing an administrative panel as part of the graphical user interface; and
providing a sender information panel as part of the graphical user interface;
wherein providing the sender information panel comprises:
providing a view/edit sender profile link;
providing a manage alerts link;
providing a required bond value indication mechanism;
providing a maximum allowed monthly volume indication mechanism;
providing a time period selection mechanism;
providing an output type selection mechanism;
providing a selectable processing mechanism;
providing a membership selection mechanism;
providing an IP address addition and deletion mechanism;
providing a ticket number selection mechanism;
providing a text display and entry field; and
providing a second selectable processing mechanism.

17. A method of facilitating transmission of a message from a sender to a receiver, comprising:
receiving a query about whether the sender of the message satisfies specified sending criteria;
creating and storing information relating to whether the sender satisfies the specified sending criteria;
providing a complaints panel as part of a graphical user interface that reports the information;
providing a bond panel as part of the graphical user interface;
providing a statistics by IP address panel as part of the graphical user interface;
providing an administrative panel as part of the graphical user interface; and
providing a sender information panel as part of the graphical user interface;
wherein providing the statistics by IP address panel comprises:
providing an IP address indicator;
providing a hostname indicator;
providing a seven-day volume indicator;
providing a month-to-day volume indicator;
providing a last month's volume indicator;
providing a peak daily volume indicator;
providing a complaints indicator;
providing a spamtraps indicator;
providing a blacklists indicator;
providing a sender status indicator;
providing an age of status indicator;
providing a status selection mechanism;
providing a selectable processing mechanism; and
providing a selection column.

18. A method of facilitating transmission of a message from a sender to a receiver, comprising:
receiving a query about whether the sender of the message satisfies specified sending criteria;
creating and storing information relating to whether the sender satisfies the specified sending criteria;
providing an administrative panel as part of a graphical user interface that displays the information; and
providing a company statistics panel as part of the graphical user interface;
wherein providing the company statistics panel comprises:
providing a filter by status indicator;
providing a company information indicator;
providing a seven-day volume column;
providing a month-to-day volume indicator;
providing a last-month volume indicator;
providing a seven-day complaints indicator;
providing a month-to-day complaints indicator;
providing a seven-day complaints per million messages sent indicator;
providing a month-to-day complaints per million messages sent indicator;
providing a month-to-day spamtraps indicator;
providing a status indicator; and
providing an age of status indicator.

* * * * *